US012704775B2

(12) United States Patent
Kayano

(10) Patent No.: US 12,704,775 B2
(45) Date of Patent: Aug. 11, 2026

(54) PROJECTION LENS AND PROJECTION DEVICE

(71) Applicant: FUJIFILM Corporation, Tokyo (JP)

(72) Inventor: Hironobu Kayano, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 786 days.

(21) Appl. No.: 18/069,260

(22) Filed: Dec. 21, 2022

(65) Prior Publication Data

US 2023/0205071 A1 Jun. 29, 2023

(30) Foreign Application Priority Data

Dec. 23, 2021 (JP) ................................ 2021-209610

(51) Int. Cl.

| | |
|---|---|
| ***G03B 21/28*** | (2006.01) |
| ***G02B 7/02*** | (2021.01) |
| ***G02B 13/16*** | (2006.01) |

(52) U.S. Cl.
CPC ............ *G03B 21/28* (2013.01); *G02B 7/021* (2013.01); *G02B 13/16* (2013.01)

(58) Field of Classification Search
CPC ... G03B 21/00–64; G03B 17/54; G02B 7/021
See application file for complete search history.

(56) References Cited

U.S. PATENT DOCUMENTS 5,537,168 A * 7/1996 Kitagishi .............. G03B 21/53 353/69
2015/0378247 A1* 12/2015 Otsuki ................ H04N 9/3141 353/101

FOREIGN PATENT DOCUMENTS

JP 2015-102662 A 6/2015

OTHER PUBLICATIONS

Japanese Office Action for corresponding Japanese Application No. 2021-209610, dated May 7, 2025, with English translation.

* cited by examiner

*Primary Examiner* — Jessica M Merlin
(74) *Attorney, Agent, or Firm* — Birch, Stewart, Kolasch & Birch, LLP

(57) ABSTRACT

The projection lens includes: a third optical system that projects an image light toward a screen and that includes an emission lens located on a most projection surface side; and a light receiver. The light receiver receives an optical signal from the remote controller. The light receiver is attached to a position capable of receiving the optical signal transmitted through an emission lens, specifically, to a holding frame, and more specifically, to a first surface of the holding frame.

16 Claims, 18 Drawing Sheets

REDUCTION SIDE
ENLARGEMENT SIDE
Z
Y
X
MADE OF RESIN
L1
L11
L12
L13
L14
L15
L16
L2
L21
L22
L3
L31
L32
L33
L34
L35
A1
A2
A3
MI
11
12
17
18
30
31
32
33
34
35
36
37
38
39
40
41
42

FORMED BY EJECTOR PIN
61
82
RS_L35
80
RSE_L35
81
80
A3
81
82
80
80
80
L35
82
Z
X
Y

ENLARGEMENT SIDE
REDUCTION SIDE
107
106
63
62
60
108
61
39
105
OS
MATERIAL THAT TRANSMITS OPTICAL SIGNAL
L22
Z
Y
X

PROJECTION LENS AND PROJECTION DEVICE

CROSS-REFERENCE TO RELATED APPLICATIONS

The present application claims priority under 35 U.S.C. § 119 to Japanese Patent Application No. 2021-209610 filed on Dec. 23, 2021. The above application is hereby expressly incorporated by reference, in its entirety, into the present application.

BACKGROUND

1. Technical Field

The technology of the present disclosure relates to a projection lens and a projection device.

2. Description of the Related Art

JP2015-102662A discloses an image projection device which includes a light receiving sensor that detects a signal of light emitted from a remote controller and of which operations and settings are remotely controlled on the basis of the signal detected by the light receiving sensor, the image projection device comprising a holding member that holds the light receiving sensor, and a support portion that supports the holding member so as to be rotatable around a center line, in which in the holding member, a shape of a contour line of a portion exposed to the outside in a cross-section perpendicular to the center line at each position along the center line is a substantially circular shape or a substantially circular arc shape.

SUMMARY

An embodiment of the technology of the present disclosure provides a projection lens and a projection device that can be remotely operated by a remote controller, for example, even in a usage form in which only a first lens located on the most enlargement side of a magnifying optical system is exposed to the outside.

According to the present disclosure, there is provided a projection lens that projects an image light onto a projection surface, the projection lens comprising: an optical system including a first lens located on a most projection surface side; and a light receiver that receives an optical signal from a remote controller, the light receiver being disposed at a position capable of receiving the optical signal transmitted through the first lens.

It is preferable that the optical system is a magnifying optical system that magnifies and projects the image light toward the projection surface.

It is preferable that a holding frame that holds the first lens is further provided, and the light receiver is attached to the holding frame.

It is preferable that the optical system includes a second lens disposed on a side opposite to the projection surface of the first lens, the second lens having a lens surface with a radius smaller than a radius of a lens surface of the first lens, the holding frame has a first surface facing an end portion of the first lens, a second surface facing an end portion of the second lens, and an intermediate surface extending in a radial direction and interconnecting the first surface and the second surface, and the light receiver is attached to at least one of the first surface, the second surface, or the intermediate surface.

It is preferable that the light receiver is attached to the first surface or the intermediate surface.

It is preferable that a circuit board on which a control circuit that controls an operation of the light receiver is mounted is further provided, and the light receiver is disposed on a side of the first surface, the second surface, or the intermediate surface, and the circuit board is disposed on a side of a surface of the holding frame, which is on a side opposite to the first surface, the second surface, or the intermediate surface.

It is preferable that in a case where the radius of the lens surface of the first lens is denoted by G1 and the radius of the lens surface of the second lens is denoted by G2, a value of G1/G2 is 1.7 or more, and the light receiver is attached to the intermediate surface.

It is preferable that the first lens or the second lens has a recess portion provided in a surface on the side opposite to the projection surface, and the light receiver is disposed in the recess portion.

It is preferable that the first lens or the second lens is made of a resin, and the recess portion is formed by an ejector pin used in a case where the first lens or the second lens is extruded from a mold.

It is preferable that the first lens has a straight end part and a curved end part, and the light receiver is disposed at a position facing the straight end part.

It is preferable that a mirror that reflects the image light to make the image light incident on the optical system is further provided, and the light receiver is attached to a periphery of the mirror.

It is preferable that the light receiver is attached to a position facing a surface of the mirror, which is on a side opposite to a reflecting surface, and the mirror is formed of a material that transmits the optical signal.

It is preferable that a connection portion that is electrically connected to a projection device including an image forming unit that forms the image light is further provided, and the light receiver transmits the optical signal to the projection device via the connection portion.

It is preferable that the projection lens is attachable to and detachable from the projection device through the connection portion.

According to the present disclosure, there is provided a projection device comprising: the projection lens according to any one of the above; and an image forming unit that forms the image light projected onto the projection surface through the projection lens.

BRIEF DESCRIPTION OF THE DRAWINGS

Exemplary embodiments according to the technique of the present disclosure will be described in detail based on the following figures, wherein:

FIG. 7 is an exploded perspective view of an emission lens, the holding frame, a light-receiving unit, and the like;

FIG. 8 is an exploded perspective view of the emission lens, the holding frame, the light-receiving unit, and the like;

DETAILED DESCRIPTION

Hereinafter, an example of embodiments of the technology of the present disclosure will be described with reference to the drawings. It should be noted that terms such as “first”, “second”, and “third” used in the present specification are added to avoid confusion between the constituent elements, and do not limit the number of constituent elements present in a projection device or a projection lens.

First Embodiment

Figure 1:
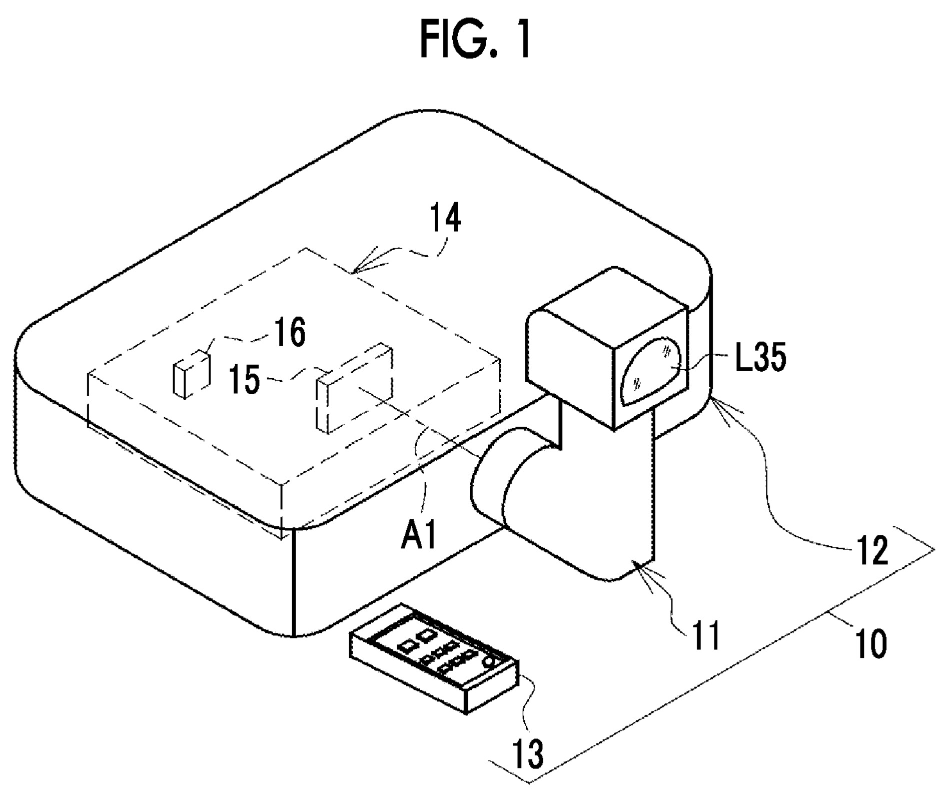
FIG. 1 is a diagram showing a projector provided with a projection lens.

As shown in FIG. 1 as an example, a projector 10 comprises a projection lens 11, a body portion 12, and a remote controller 13. One end part of the projection lens 11 is attached to the body portion 12. The body portion 12 accommodates main components, such as an image forming unit 14 and a control substrate. The body portion 12 is an example of the “projection device” according to the technology of the present disclosure.

The image forming unit 14 forms an image light to be projected onto a screen 21 (see FIG. 3) through the projection lens 11. The image forming unit 14 comprises an image forming panel 15, a light source 16, a light guide member (not shown), and the like. The light source 16 irradiates the image forming panel 15 with light. The light guide member guides the light from the light source 16 to the image forming panel 15.

The image forming unit 14 is, for example, a reflective type using Digital Micromirror Device (DMD: registered trademark) as the image forming panel 15. As is well known, the DMD has a plurality of micromirrors capable of changing the reflection direction of light emitted from the light source 16, and is an image display element in which the respective micromirrors are two-dimensionally arranged on a pixel-by-pixel basis. The DMD changes the direction of each micromirror according to the image to switch between the on and off of the reflected light of the light from the light source 16, thereby performing optical modulation according to the image.

An example of the light source 16 includes a white light source. The white light source emits white light. The white light source is realized, for example, by combining a laser light source and a phosphor. The laser light source emits blue light as excitation light with respect to the phosphor. The phosphor emits yellow light by being excited by the blue light emitted from the laser light source. The white light source emits white light by combining the blue light emitted from the laser light source and the yellow light emitted from the phosphor. The image forming unit 14 is provided with a rotational color filter that further selectively converts the white light emitted by the light source 16 into each color light of blue light, green light, and red light in a time-division manner. The image forming panel 15 is selectively irradiated with each color light of blue, green, and red, thereby obtaining the image light carrying image information of each color of blue, green, and red. The image light of each color obtained in this way is selectively incident on the projection lens 11 and is projected onto the screen 21. The image light of each color is integrated on the screen 21. Therefore, a full-color image P (see FIG. 3) is displayed on the screen 21.

Alight beam representing the image formed by the image forming unit 14 is incident on the projection lens 11 from the body portion 12. The projection lens 11 magnifies and forms an image of the image light based on the incident light beam. With this, the projection lens 11 projects the image P, which is a magnified image of the image formed by the image forming unit 14, from the outermost emission lens L35 onto the screen 21.

The remote controller 13 is an operation member for remotely operating the projector 10, and is driven by a battery. The remote controller 13 has a plurality of buttons for operation instructions, such as a power button, a zoom button, and a focus button. The remote controller 13 emits, for example, an optical signal OS (see FIG. 6), such as infrared rays, in response to a button push operation from a user U (see FIG. 3). The optical signal OS is not limited to the infrared rays. Visible light may be used.

Figure 2:
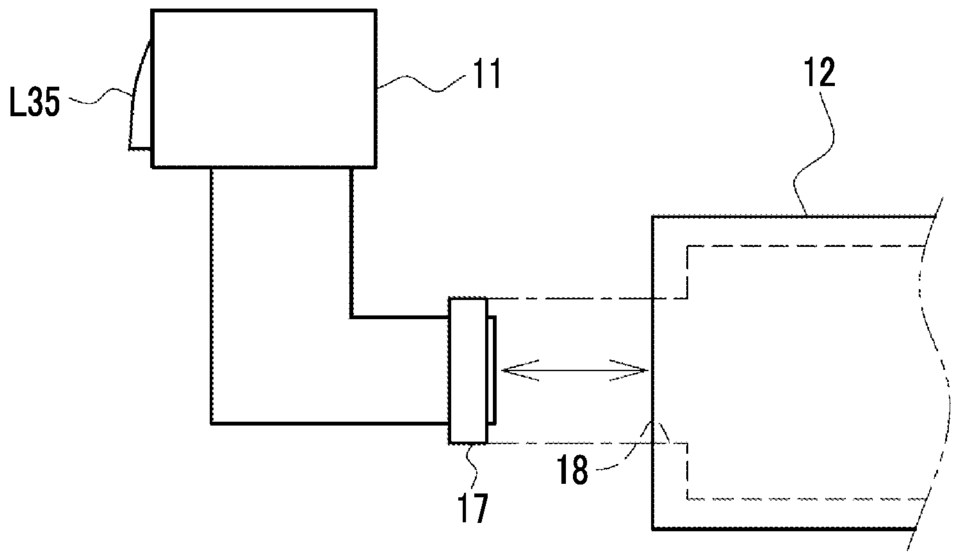
FIG. 2 is a diagram showing a connection portion of the projection lens and a body portion.

As shown in FIG. 2 as an example, the projection lens 11 comprises a connection portion 17. The connection portion 17 is a so-called mount portion, and has a plurality of electrodes (not shown). The body portion 12 is provided with a connection portion 18 corresponding to the connection portion 17. The connection portion 18 is also a so-called mount portion, and has a plurality of electrodes (not shown). The projection lens 11 is mechanically and electrically connected to the body portion 12 (via the electrodes of the connection portion 17 and the connection portion 18) by connecting the connection portion 17 to the connection portion 18 of the body portion 12. Further, the projection lens 11 is attachable to and detachable from the body portion 12 through the connection portion 17. Specifically, the connection portion 17 is connected and fixed to the connection portion 18 by engaging a protrusion (not shown) formed in the connection portion 18 on the projector 10 side with a groove (not shown) formed in the connection portion 17 on the projection lens 11 side, and rotating the projection lens 11 clockwise in the peripheral direction. Further, the connection portion 17 is removed from the connection portion 18 by rotating the projection lens 11 counterclockwise in the peripheral direction in a state in which the connection portion 17 and the connection portion 18 are fixed.

Figure 3:
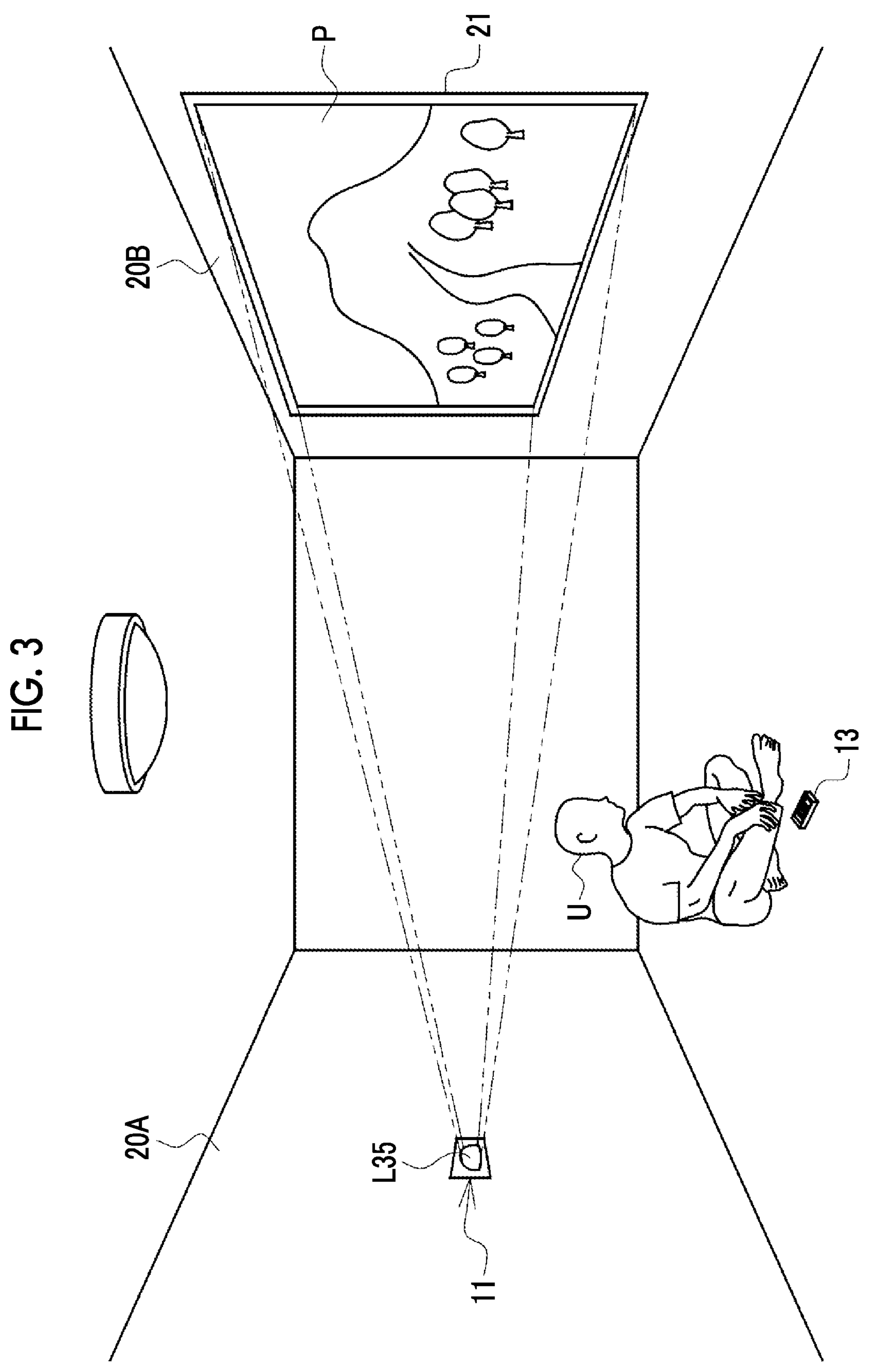
FIG. 3 is a diagram showing a usage form of the projector.

As shown in FIG. 3 as an example, the projector 10 is built in, for example, a wall 20A of a room of the user U, and is used in a form in which only the emission lens L35 of the projection lens 11 is exposed to the outside. The image light emitted from the emission lens L35 is projected on the screen 21 installed on a wall 20B on a side opposite to the wall 20A. The screen 21 is an example of the "projection surface" according to the technology of the present disclosure. The emission lens L35 is covered with a lid or the like when the projector 10 is not used. In addition, the projector 10 can also be used by being taken out from the wall 20A.

Figure 4:
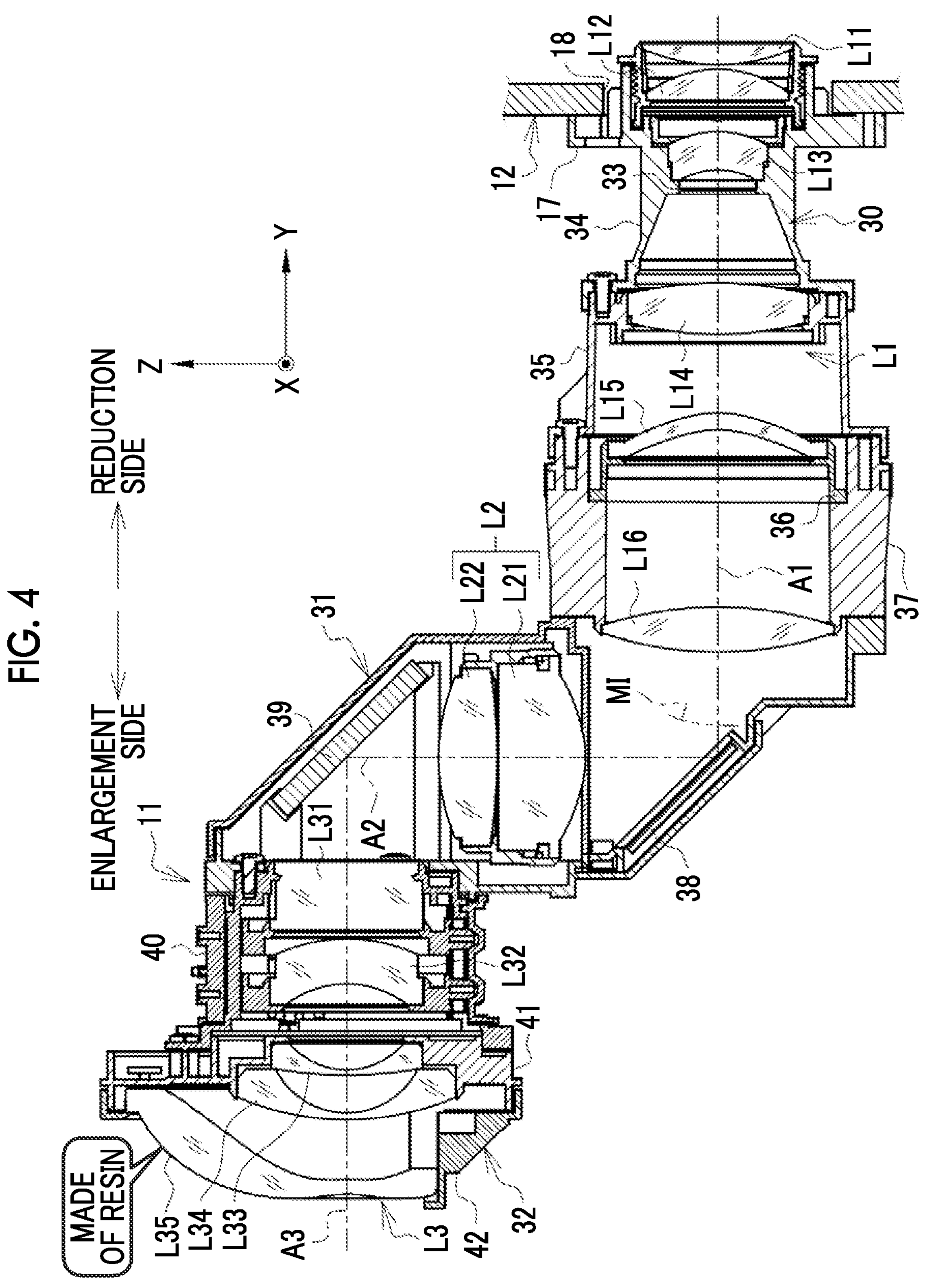
FIG. 4 is a cross-sectional view of the projection lens.

As shown in FIG. 4 as an example, the projection lens 11 comprises a bending optical system. The bending optical system has a first optical axis A1, a second optical axis A2, and a third optical axis A3. The first optical axis A1 is an optical axis through which light from the body portion 12 passes. The second optical axis A2 is an optical axis that is bent by 90° with respect to the first optical axis A1. The third optical axis A3 is an optical axis that is bent by 90° with respect to the second optical axis A2. Therefore, the first optical axis A1 and the third optical axis A3 are parallel to each other. Here, "90°" refers to 90° in the sense including an error generally allowed in the technical field to which the technology of the present disclosure belongs, and an error to the extent that does not violate the gist of the technology of the present disclosure, in addition to the complete 90°. In addition, "parallel" refers to parallel in the sense including an error generally allowed in the technical field to which the technology of the present disclosure belongs, and an error to the extent that does not violate the gist of the technology of the present disclosure, in addition to perfect parallel. FIG. 4 shows the projection lens 11 in a state in which the exterior cover is removed.

In the following description, a direction parallel to the first optical axis A1 and the third optical axis A3 is expressed as a Y direction, a direction parallel to the second optical axis A2 is expressed as a Z direction, and a direction orthogonal to the Y direction and the Z direction is expressed as an X direction. Further, a side of the screen 21, which is a projection surface, is referred to as a projection surface side or an enlargement side, and a side opposite to the screen 21 is referred to as a side opposite to the projection surface or a reduction side.

The projection lens 11 has a first lens barrel part 30, a second lens barrel part 31, and a third lens barrel part 32. The first lens barrel part 30 is located on a side farthest from the screen 21, and the third lens barrel part 32 is located on a side closest to the screen 21. The second lens barrel part 31 is located between the first lens barrel part 30 and the third lens barrel part 32. Each of the lens barrel parts 30 to 32 holds a lens. The lens held in the first lens barrel part 30 is disposed on the first optical axis A1, the lens held in the second lens barrel part 31 is disposed on the second optical axis A2, and the lens held in the third lens barrel part 32 is disposed on the third optical axis A3. The central axis of the first lens barrel part 30 substantially coincides with the first optical axis A1, the central axis of the second lens barrel part 31 substantially coincides with the second optical axis A2, and the central axis of the third lens barrel part 32 substantially coincides with the third optical axis A3. In the present specification, in order to simplify the description, a plurality of lenses may be omitted and expressed as one lens.

The first lens barrel part 30 holds a first optical system L1. The first optical system L1 is composed of, for example, a lens L11, a lens L12, a lens L13, a lens L14, a lens L15, and a lens L16, and is disposed along the first optical axis A1. The first optical system L1 forms an intermediate image MI of the image light from the body portion 12. The intermediate image MI is formed on the reduction side with respect to a second optical system L2, for example, on the reduction side with respect to a first mirror 38, which will be described later. In other words, the intermediate image MI is formed at a position between the lens L16 and the first mirror 38. Further, a fixed stop 33 is provided between the lens L13 and the lens L14. The fixed stop 33 narrows the light beam incident from the body portion 12.

The lens L11, the lens L12, and the lens L13 are held by a holding frame 34. The lens L11 and the lens L12 constitute, for example, a zoom lens group and are movable along the first optical axis A1 by an actuator, such as a motor. The lens L14 is held by a holding frame 35. The lens L15 is held by a holding frame 36. The lens L16 is held by a holding frame 37. The holding frame 37 holds the holding frame 36. The holding frame 36 is an inner frame, and the holding frame 37 is an outer frame.

The lens L15 is a lens that mainly has a function of correcting an aberration, such as a field curvature aberration. For this reason, an aspherical lens having an aspherical lens surface, which is advantageous for correcting aberrations, is employed for the lens L15. Since it is easier to manufacture an aspherical lens formed of a resin than an aspherical lens formed of glass, the lens L15 is formed of a resin, such as a cycloolefin polymer. On the other hand, all the lenses constituting the first optical system L1 except for the lens L15 are formed of glass in this example. Here, the lens surface refers to a surface through which the image light is transmitted through the lens. The lens L15 may be formed of glass.

The second lens barrel part 31 holds the second optical system L2. The second optical system L2 is composed of, for example, a lens L21 and a lens L22, and is disposed along the second optical axis A2. The lens L21 and the lens L22 are formed of glass. In this example, the second optical system L2 functions as a relay lens. More specifically, the second optical system L2 relays a light beam representing the intermediate image MI to the third lens barrel part 32 with the intermediate image MI formed by the first optical system L1 as a subject.

In addition, the second lens barrel part 31 integrally holds the first mirror 38 and a second mirror 39. Each of the first mirror 38 and the second mirror 39 is one of the optical elements constituting the bending optical system, and bends the optical axis. The first mirror 38 bends the light of the first optical axis A1 to obtain the light of the second optical axis A2. The second mirror 39 bends the light of the second optical axis A2 to obtain the light of the third optical axis A3. The second mirror 39 is an example of the "mirror that reflects the image light to make the image light incident on the optical system" according to the technology of the present disclosure.

The first mirror 38 is held in a posture in which the reflecting surface forms an angle of 45° with respect to each of the first optical axis A1 and the second optical axis A2. Similarly, the second mirror 39 is held in a posture in which the reflecting surface forms an angle of 45° with respect to each of the second optical axis A2 and the third optical axis A3. The first mirror 38 and the second mirror 39 are each a specular reflective mirror type mirror in which a transparent member, such as glass, is coated with a reflective film. The first mirror 38 and the second mirror 39 may be each a mirror formed of a prism that totally reflects light.

The third lens barrel part 32 holds a third optical system L3. The third optical system L3 is composed of a lens L31, a lens L32, a lens L33, a lens L34, and the emission lens L35, and is disposed along the third optical axis A3. The third optical system L3 is an example of the "optical system" and the "magnifying optical system" according to the technology of the present disclosure. Further, the emission lens L35 is an example of the "first lens" according to the technology of the present disclosure, and the lens L34 is an example of the "second lens" according to the technology of the present disclosure.

The lens L31 and the lens L32 are held by a holding frame 40. The lens L31 and the lens L32 constitute, for example, a focus lens group and are movable along the third optical axis A3 by an actuator, such as a motor. The lens L33 and the lens L34 are held by a holding frame 41. The emission lens L35 is held by the holding frame 41 and a holding frame 42. The holding frame 42 holds the holding frame 41. The holding frame 41 is an inner frame, and the holding frame 42 is an outer frame. The holding frame 41 is an example of the "holding frame that holds the first lens" according to the technology of the present disclosure.

The lens L33 and the lens L34 have a negative refractive power in order to magnify the image P to be projected, and emit the image light. The emission lens L35 is a lens located on the most enlargement side and emits the image light toward the screen 21. The emission lens L35 has a straight end part 45 and a curved end part 46 (both see FIGS. 11 and 16), and is a D-shaped lens in a plan view, in which a part of an outer edge portion below the third optical axis A3 is cut into a linear shape (see also FIG. 10). The emission lens L35 is the same aspherical lens as the lens L15, and is formed of a resin, such as a cycloolefin polymer. On the other hand, the lens L33 and the lens L34 located on the reduction side of the emission lens L35 are each a spherical lens having a spherical lens surface and formed of glass. Similarly, the lens L31 and the lens L32 are each a spherical lens having a spherical lens surface and formed of glass.

The half angle of view of the projection lens 11 is, for example, 63° or more and more preferably 65° or more. In order to secure such a wide half angle of view, the lens L33 and the lens L34 are required to have a high refractive power. In order to secure the high refractive power, a lens made of glass is preferable to a lens made of a resin. However, in a case where a lens made of glass is employed, the diameter of the lens surface is preferably small because the weight increases as the diameter increases. In that respect, the lens L33 and the lens L34 are formed of glass such that the high refractive power can be secured while suppressing an increase in the diameter of the lens surface. With this, it is possible to widen the angle of view of the image P to be projected while keeping the diameter of the lens surface relatively small.

Meanwhile, the emission lens L35 mainly has a function of correcting an aberration in the third optical system L3. As described above, the lens L33 and the lens L34 have the high refractive power in order to realize a wide angle while maintaining a small diameter. In general, the higher the refractive power is, the larger the field curvature aberration and the distortion are. The aberration correction capability of the aspherical lens is higher than that of the spherical lens. For this reason, the aspherical lens is employed for the emission lens L35 that is combined with a lens having a high refractive power, such as the lens L33 the lens L34. Further, since the emission lens L35 is disposed on the most enlargement side, the emission lens L35 is a lens of which the lens surface has the largest radius, among the projection lenses 11, and the shape is an aspherical shape. As described above, it is very difficult to manufacture an aspherical lens having a large diameter by using glass. Therefore, the emission lens L35 is formed of a resin.

Figure 5:
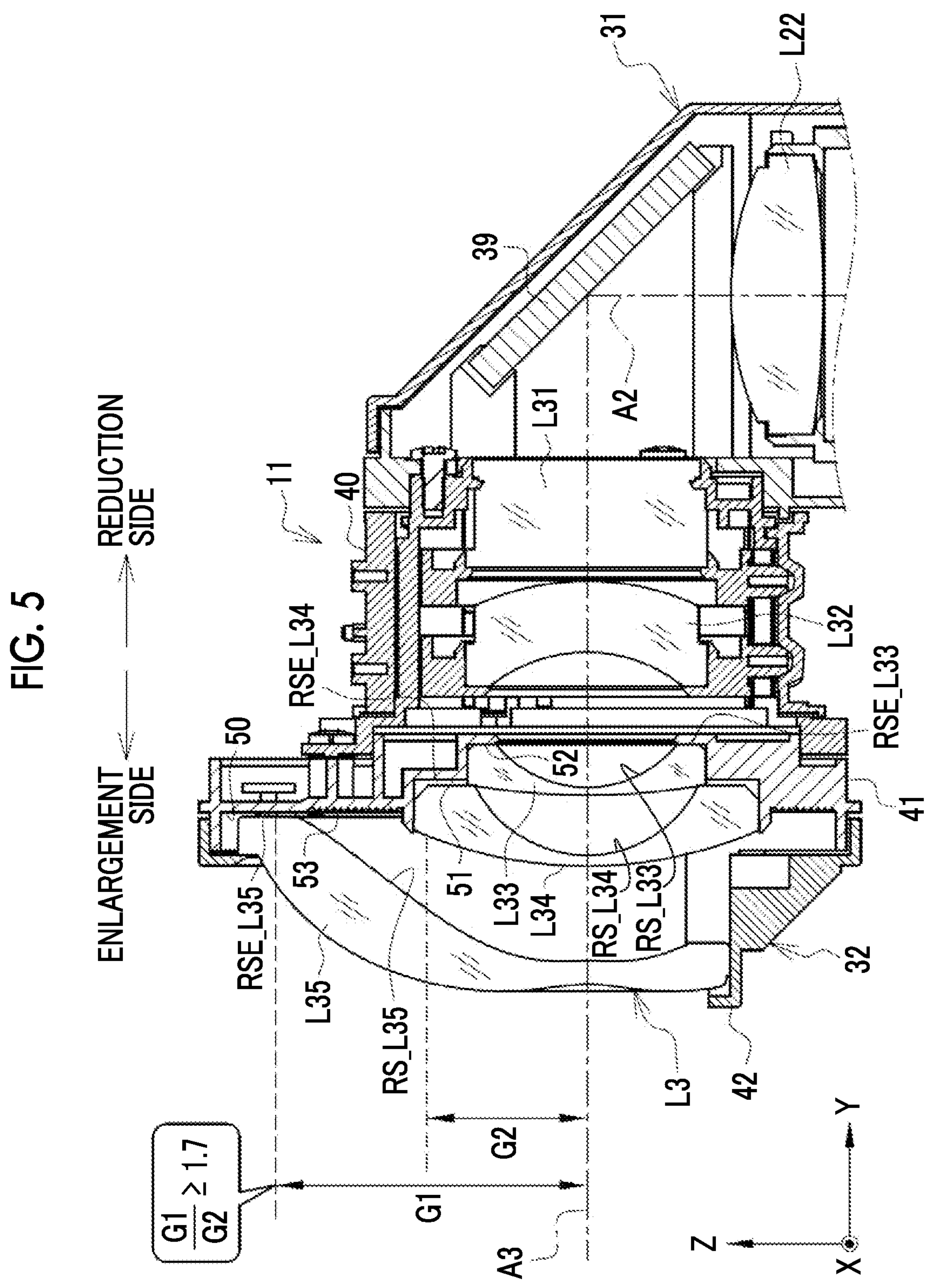
FIG. 5 is an enlarged cross-sectional view of a vicinity of a third lens barrel part of the projection lens.

As shown in FIG. 5 as an example, in a case where the radius of the lens surface of the emission lens L35 is denoted by G1, and the radius of the lens surface of the lens L34 is denoted by G2, the value of G1/G2 is 1.7 or more ($G1/G2 \geq 1.7$). Here, the radius of the lens surface is a distance from the optical axis to the outermost peripheral light ray transmitted through the lens, and is a so-called effective radius. The value of G1/G2 is preferably 3 or less ($G1/G2 \leq 3$).

The holding frame 41 has a first surface 50, a second surface 51, a third surface 52, and an intermediate surface 53. These surfaces 50 to 53 are each a surface extending in the radial direction and parallel to the XZ plane. The first surface 50 is located on the outermost side of the holding frame 41 in the radial direction, among these surfaces 50 to 53, and has an annular fan shape (see FIG. 8). The first surface 50 faces an end portion RSE_L35 of a reduction-side surface RS_L35 of the emission lens L35. The second surface 51 and the third surface 52 each have an annular shape (see FIG. 8). The second surface 51 is located at a position stepped in toward the reduction side from the first surface 50 and the intermediate surface 53. The third surface 52 is located at a position further stepped in toward the reduction side from the second surface 51. The lens L34 is held in the stepped portion formed between the first surface 50 and the intermediate surface 53, and the second surface 51. Further, the lens L33 is held in the stepped portion formed between the second surface 51 and the third surface 52. The second surface 51 faces an end portion RSE_L34 of a reduction-side surface RS_L34 of the lens L34. The third surface 52 faces an end portion RSE_L33 of a reduction-side surface RS_L33 of the lens L33.

The intermediate surface 53 has an annular shape (see FIG. 8) and interconnects the first surface 50 and the second surface 51. A plurality of grooves having a V-shaped cross-section are formed in the intermediate surface 53. The intermediate surface 53 functions as a light scattering surface that restrains the generation of stray light that is noise for the image P, through the plurality of grooves. The stray light is caused by return light toward the reduction side due to the Fresnel reflection on the lens surface of the emission lens L35. This return light is scattered by the light scattering surface and is not locally concentrated. Therefore, the generation of stray light can be restrained.

Figure 6:
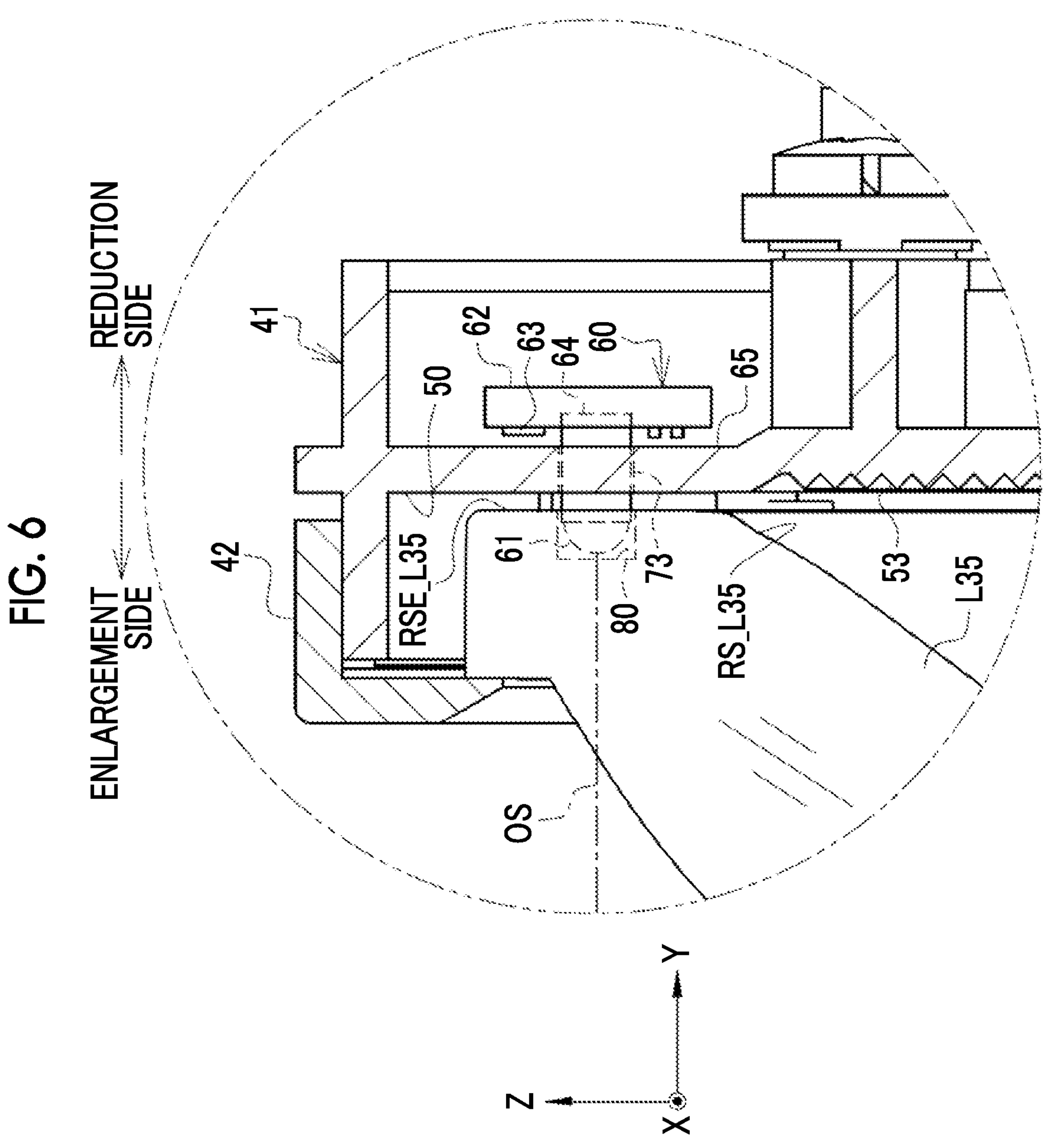
FIG. 6 is an enlarged cross-sectional view of a vicinity of a first surface of a holding frame.

As shown in FIG. 6 as an example, a light-receiving unit 60 is attached to the first surface 50. The light-receiving unit 60 includes a light receiver 61 and a circuit board 62. The light receiver 61 has a cylindrical shape with a rounded tip, and receives the optical signal OS from the remote controller 13, which is transmitted through the emission lens L35, through a built-in light-receiving element of the tip. The circuit board 62 has a rectangular plate shape, and a control circuit 63 that controls the operation of the light receiver 61 is mounted thereon. A connector 64 (see also FIG. 9) that connects the circuit board 62 to the light receiver 61 is provided at the center portion of the circuit board 62. In the light receiver 61, the tip with the built-in light-receiving element of the optical signal OS is disposed on the side of the first surface 50. On the other hand, the circuit board 62 is disposed on a side of a back surface 65 of the holding frame 41, which is a surface on a side opposite to the first surface 50 and faces the reduction side. Although not shown, a wiring line for transmitting the optical signal OS to a processor such as a central processing unit (CPU) provided in the body portion 12 is connected to the circuit board 62. The wiring line is connected to the connection portion 17. The light receiver 61 transmits the optical signal OS to the body portion 12, via the wiring line and the connection portion 17. FIG. 6 shows a state in which the light receiver 61 receives the optical signal OS parallel to the Y direction, but the light receiver 61 can receive the optical signal OS having an incidence angle corresponding to a predetermined directional angle. The same applies to the following FIGS. 12, 14, and 17.

Figure 7:
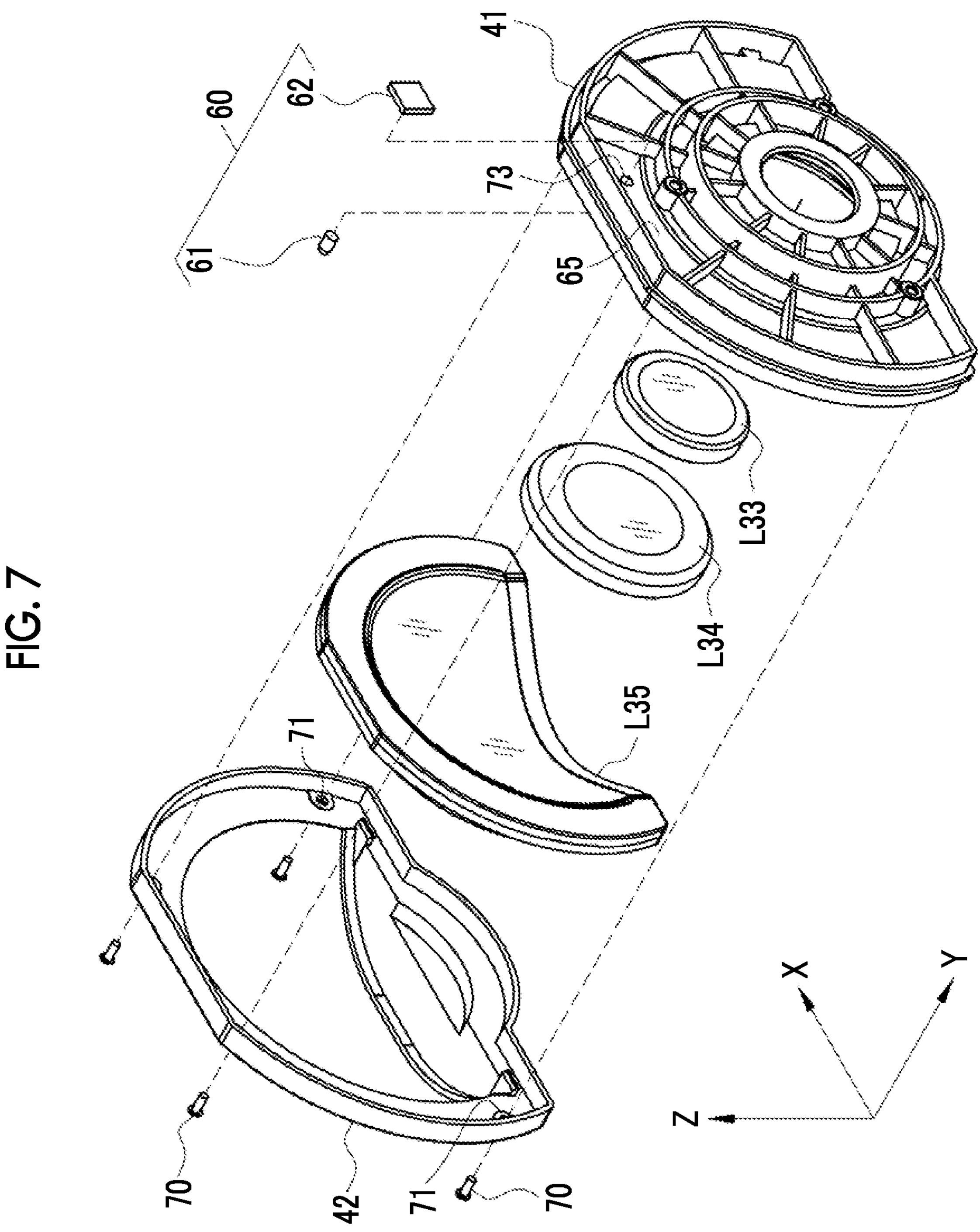
Figure 8:
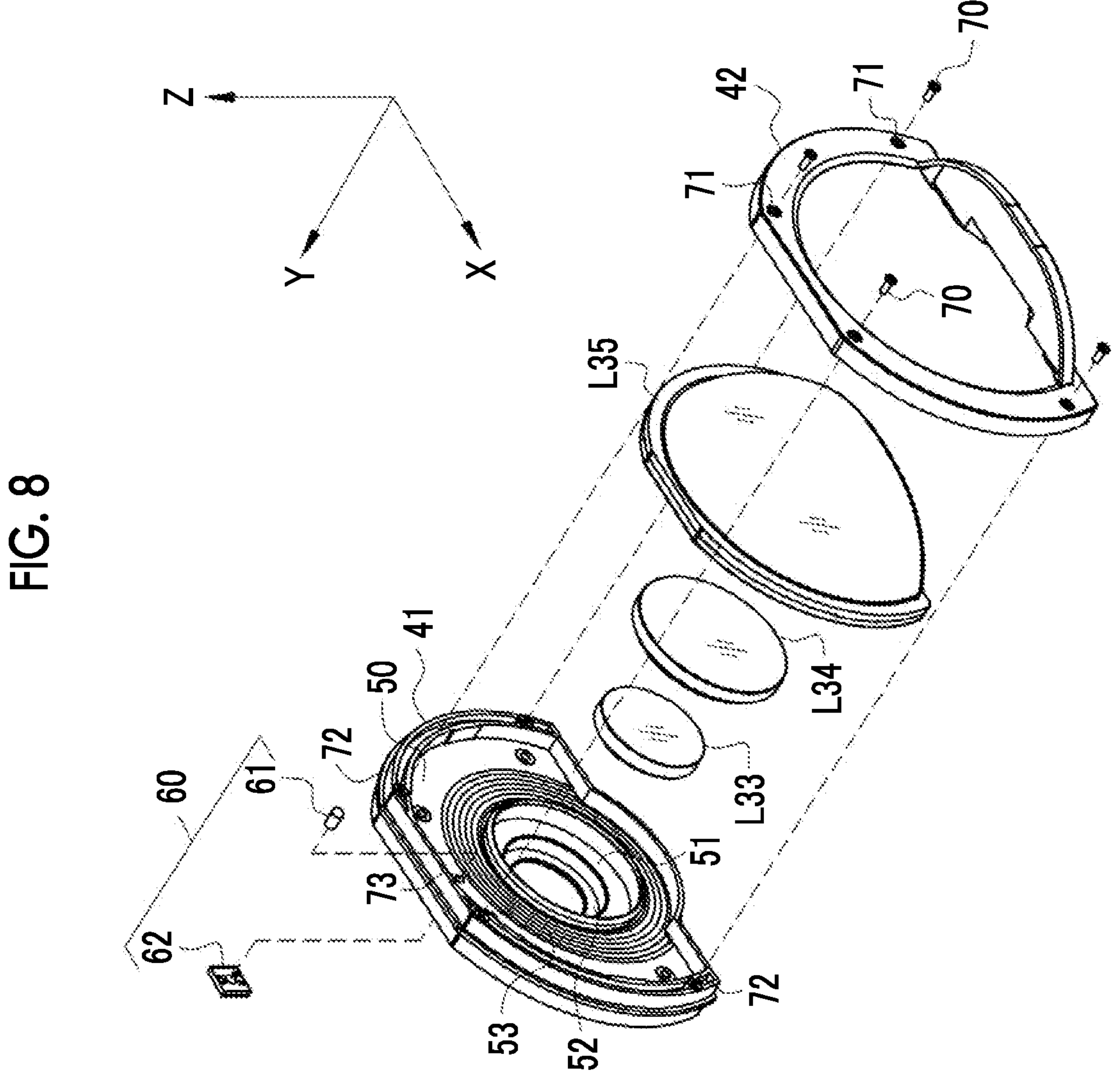

As shown in FIGS. 7 and 8 as an example, four screw insertion holes 71 into which the four screws 70 are inserted are formed in the holding frame 42. The surface of the holding frame 41 facing the holding frame 42 has four screw holes 72 formed at positions facing the screw insertion holes 71. The holding frame 42 is fastened and fixed to the holding frame 41 by inserting the screws 70 into the screw insertion holes 71 and screwing the screws 70 into the screw holes 72.

Figure 9:
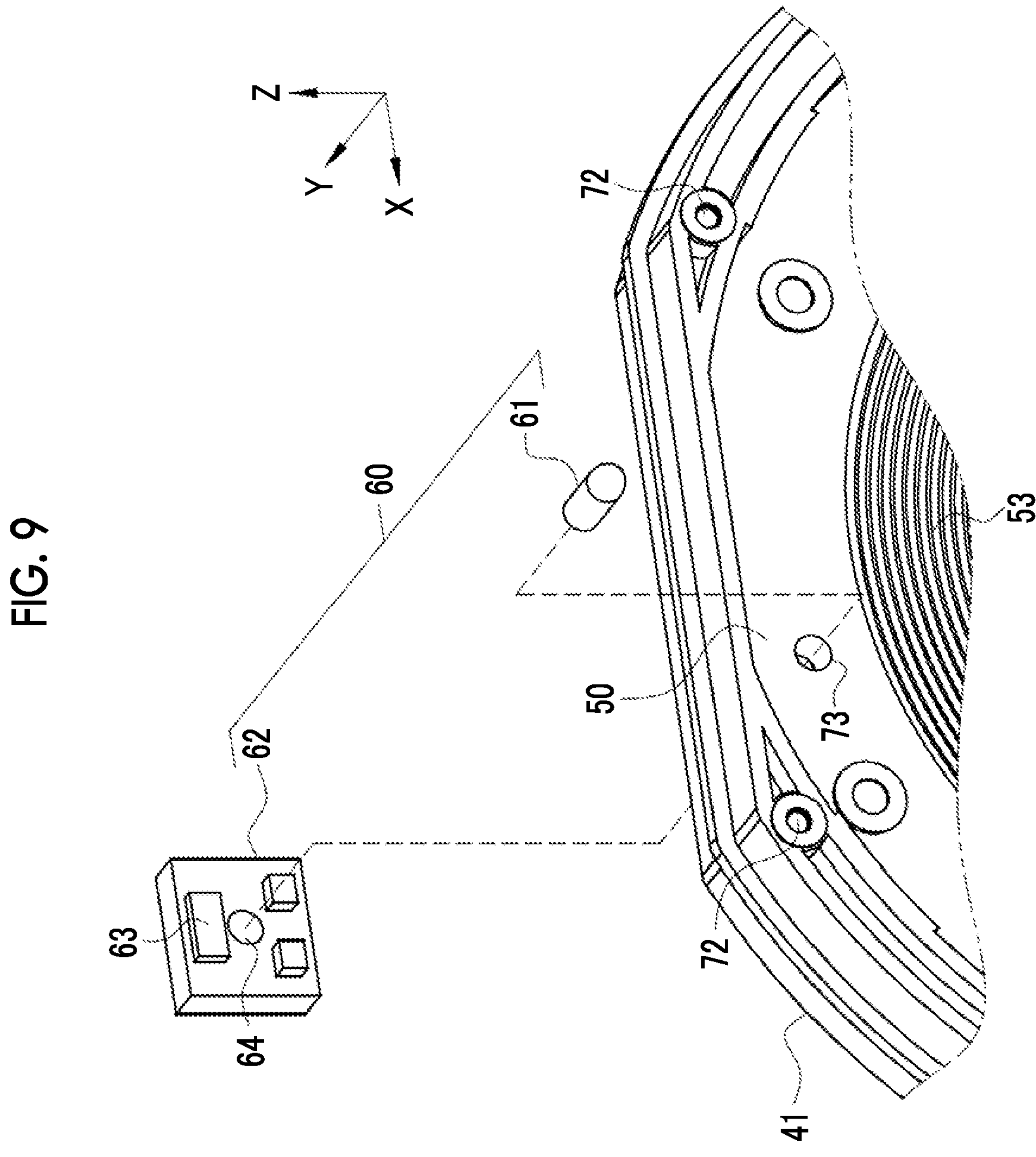
FIG. 9 is an enlarged perspective view of the vicinity of the first surface of the holding frame.

As shown in the enlarged view of FIG. 9 as an example, a through hole 73 penetrating the first surface 50 and the back surface 65 is formed in the holding frame 41. The through hole 73 has a diameter slightly larger than that of the light receiver 61. The light receiver 61 is inserted into the through hole 73. The light receiver 61 is fixed to the through hole 73 with an adhesive or the like.

Figure 10:
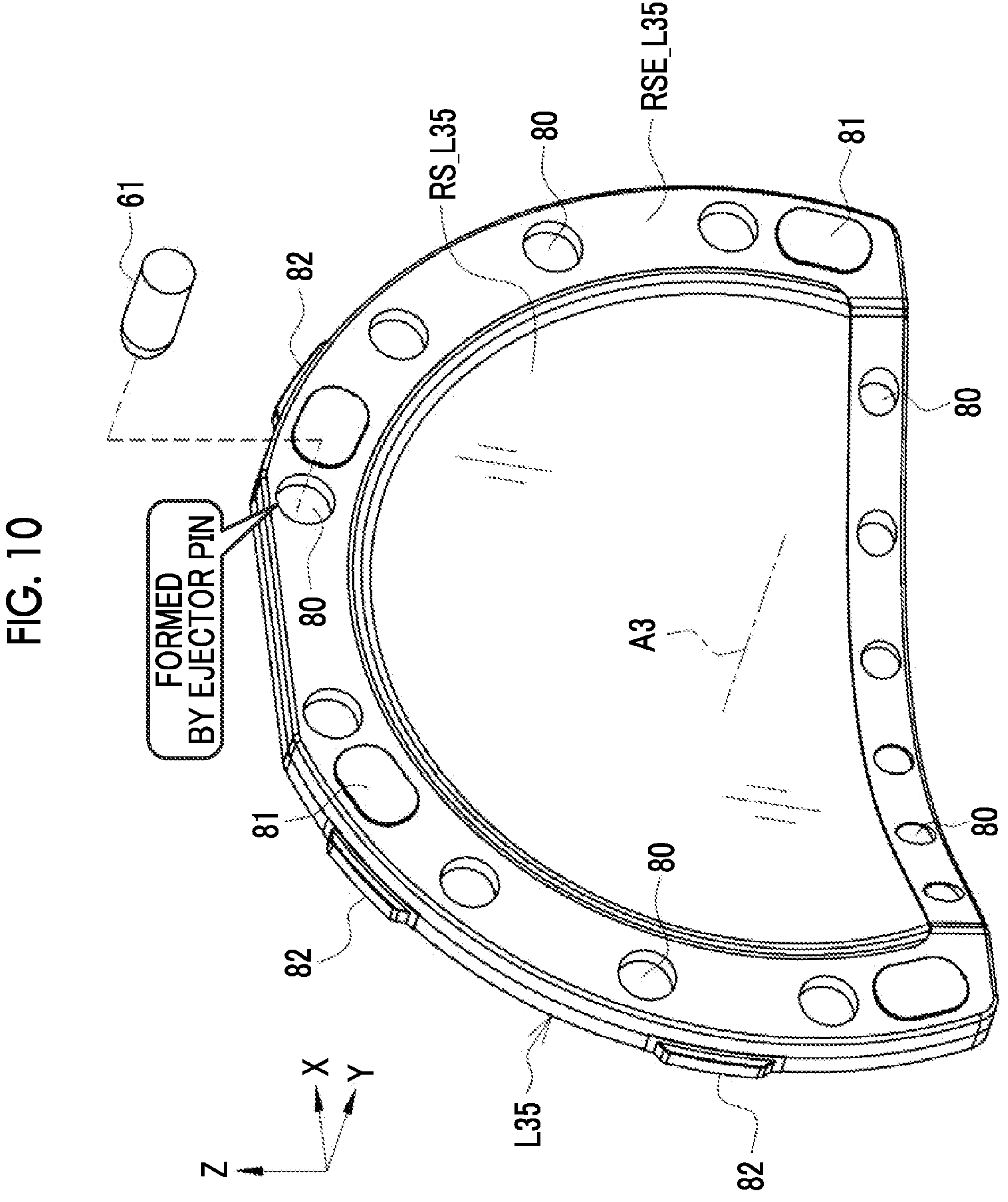
FIG. 10 is a perspective view showing a reduction-side surface of the emission lens.

As shown in FIG. 10 as an example, the end portion RSE_L35 of the reduction-side surface RS_L35 of the emission lens L35 has a plurality of circular recess portions 80. The recess portion 80 is formed by an ejector pin used in a case where the emission lens L35, which is made of a resin, is extruded from the mold. The recess portions 80 are provided at positions symmetrical to each other with respect to the third optical axis A3 in order to equalize the force applied to the emission lens L35 in a case where the emission lens L35 is extruded from the mold. The tip of the light receiver 61 is disposed in the recess portion 80 which is one of the recess portions 80 and which is located at a position corresponding to the through hole 73 (see also FIG. 6).

A plurality of oval-shaped bearing surfaces 81 are provided at the end portion RSE_L35. The bearing surface 81 comes into contact with the first surface 50. Further, a plurality of fitting protrusions 82 that slightly protrude in the radial direction are provided on the edge of the emission lens L35. The fitting protrusion 82 is fitted into a fitting groove (not shown) provided in the holding frame 41. The emission lens L35 is positioned with respect to the holding frame 41 by the bearing surface 81 and the fitting protrusion 82. The end portion RSE_L35 may not have the recess portion 80. In that case, the light receiver 61 need only be disposed by, for example, adjusting the height of the bearing surface 81 to form a gap for the light receiver 61 between the emission lens L35 and the first surface 50.

Next, the action of the above configuration will be described. In the projector 10, the image light formed by the image forming unit 14 is first incident on the lens L11 of the first optical system L1 of the projection lens 11 shown in FIG. 4. Subsequently, the image light passes through the lens L12 and the lens L13, and then passes through the fixed stop 33, whereby the amount of light is adjusted. The image light of which the amount of light is adjusted by the fixed stop 33 passes through the lens L14 and further passes through the lens L15. In the image light, the aberration is corrected by the lens L15 or the like.

The image light that has passed through the lens L15 is incident on the lens L16. Then, the intermediate image MI is formed at a position on the reduction side with respect to the first mirror 38, that is, between the lens L16 and the first mirror 38.

The image light that has passed through the lens L16 is bent by the first mirror 38 by 90° to be the light of the second optical axis A2, and passes through the second optical system L2.

The image light that has passed through the second optical system L2 is bent by the second mirror 39 by 90° again to be the light of the third optical axis A3. Then, the image light passes through the lenses L31, L32, L33, and L34 constituting the third optical system L3, and finally passes through the emission lens L35 and is projected onto the screen 21 as the image P.

In a case where the user U operates the remote controller 13 toward the emission lens L35, the optical signal OS emitted from the remote controller 13 is transmitted through the emission lens L35 and is received by the light receiver 61 of the light-receiving unit 60 attached to the first surface 50 of the holding frame 41. The optical signal OS is output from the light receiver 61 to the circuit board 62, and is further transmitted from the circuit board 62 to the processor provided in the body portion 12, via the wiring line and the connection portions 17 and 18.

The processor performs control corresponding to the optical signal OS. For example, in a case where the optical signal OS is an operation signal related to zooming, the processor moves the lens L11 and the lens L12 constituting the zoom lens group along the first optical axis A1. Further, in a case where the optical signal OS is an operation signal related to the focus, the processor moves the lens L31 and the lens L32 constituting the focus lens group along the third optical axis A3.

As described above, the projection lens 11 comprises the third optical system L3 that projects the image light toward the screen 21 and that includes the emission lens L35 located on the most projection surface side, and the light receiver 61. The light receiver 61 receives the optical signal OS from the remote controller 13. The light receiver 61 is attached to a position capable of receiving the optical signal OS transmitted through the emission lens L35, specifically, to the holding frame 41, and more specifically, to the first surface 50 of the holding frame 41. For this reason, a remote operation through the remote controller 13 is possible even in a usage form in which only the emission lens L35 illustrated in FIG. 3 is exposed to the outside.

It is also conceivable to attach the light receiver 61 to the vicinity of the emission lens L35 of the exterior cover of the projection lens 11, as a configuration in which a remote operation through the remote controller 13 is possible even in a usage form in which only the emission lens L35 is exposed to the outside. However, in that case, it is necessary to secure a space for providing the light receiver 61 in the exterior cover, and the size of the projection lens 11 is increased by the space. Therefore, it is preferable to attach the light receiver 61 at a position capable of receiving the optical signal OS transmitted through the emission lens L35, as in the technology of the present disclosure.

The third optical system L3 is a magnifying optical system that magnifies and projects the image light toward the screen 21. In the case of the magnifying optical system, the optical signal OS can be easily captured in the projection lens 11 because the radius of the lens surface of the outermost emission lens L35 has a relatively large diameter, and a concern that the remote controller 13 may not work well can be reduced.

The holding frame 41 holds the emission lens L35. In a case where the light receiver 61 is attached to the holding frame 41, it is possible to reduce the concern that the remote controller 13 may not work well because there are relatively few obstacles that obstruct the light receiver 61 in receiving the optical signal OS.

The first surface 50 to which the light receiver 61 is attached faces the end portion RSE_L35 of the emission lens L35. The emission lens L35 is located on the most enlargement side among the lenses of the third optical system L3. Therefore, in a case where the light receiver 61 is attached to the first surface 50, it is possible to further reduce the concern that the remote controller 13 may not work well because the emission lens L35 is the only obstacle that obstructs the light receiver 61 in receiving the optical signal OS. In addition, the lens surface of the emission lens L35 has the largest diameter among the lenses of the third optical system L3. In order to hold such an emission lens L35, the first surface 50 expands significantly in the radial direction. Therefore, the first surface 50 can have a relatively large area, and a space for disposing the light receiver 61 can be sufficiently secured.

The circuit board 62 on which the control circuit 63 that controls the operation of the light receiver 61 is mounted is provided. The light receiver 61 is disposed on the side of the first surface 50, and the circuit board 62 is disposed on the side of the back surface 65 of the holding frame 41, which is on the side opposite to the first surface 50. As described above, since the first surface 50 expands significantly in the radial direction, the back surface 65 also expands significantly in the radial direction as a matter of course. Therefore, the circuit board 62 can be disposed on the back surface 65 with a margin. It is also easy to route the wiring line connected to the circuit board 62.

The light receiver 61 is disposed in the recess portion 80 provided in the surface RS_L35 of the emission lens L35, which is on a side opposite to the projection surface. Therefore, the light receiver 61, that is, the light-receiving unit 60, can be compactly accommodated.

The emission lens L35 is made of a resin, and the recess portion 80 is formed by an ejector pin used in a case where the emission lens L35 is extruded from the mold. Therefore, the recess portion 80 originally present due to the manufacturing method can be effectively utilized in order to accommodate the light receiver 61. The recess portion 80 may not be formed by the ejector pin, and may be newly formed in order to accommodate the light receiver 61.

The projection lens 11 comprises the connection portion 17 that is electrically connected to the body portion 12 including the image forming unit 14 that forms the image light. The light receiver 61 transmits the optical signal OS to the body portion 12 via the connection portion 17. Therefore, the optical signal OS can be smoothly transmitted from the projection lens 11 to the body portion 12.

The projection lens 11 is attachable to and detachable from the body portion 12 through the connection portion 17. Therefore, one projection lens 11 can be shared by a plurality of the body portions 12.

Figure 11:
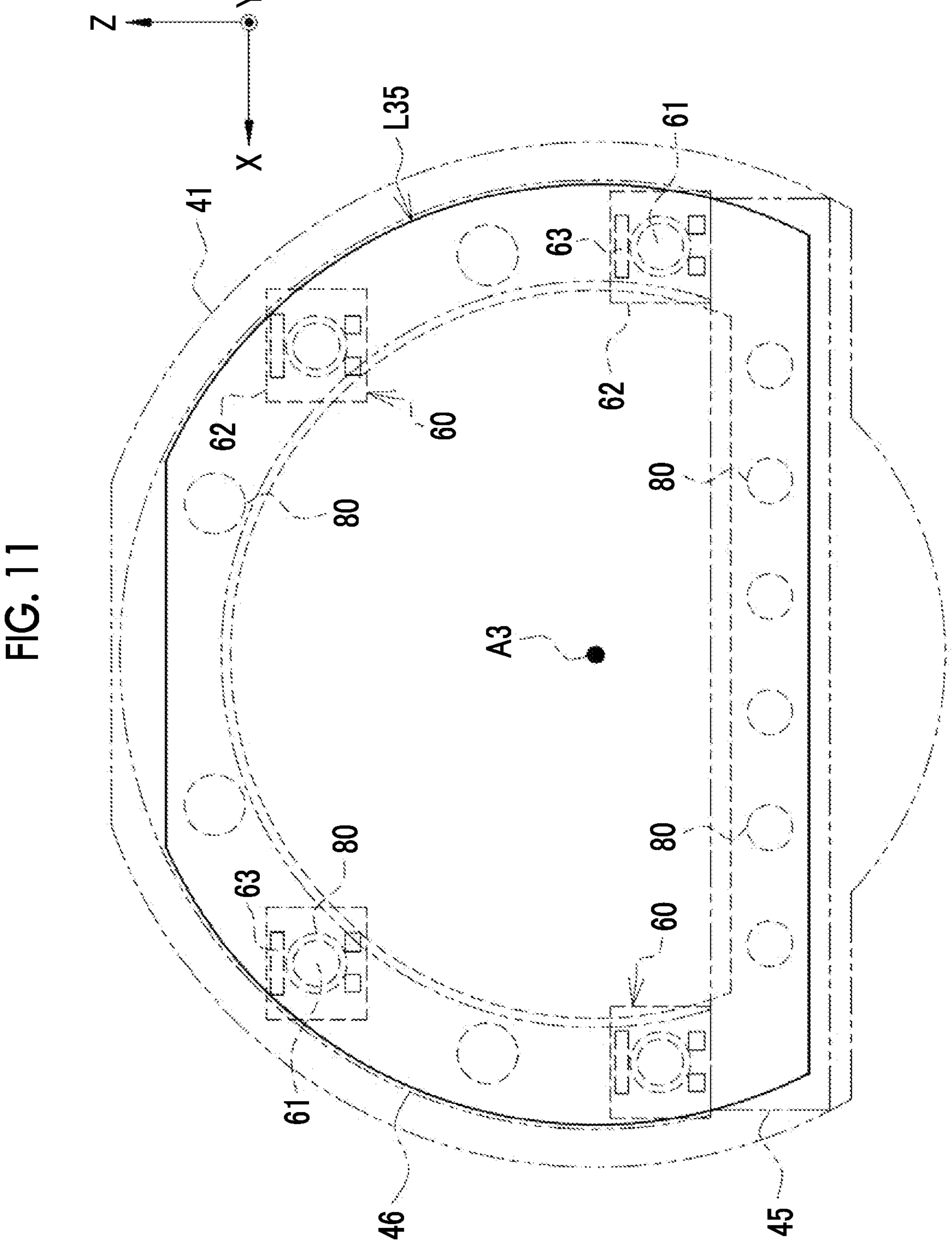
FIG. 11 is a diagram showing an example in which a plurality of the light-receiving units are attached to the first surface.

The number of light-receiving units 60 is not limited to one, and a plurality of the light-receiving units 60 may be disposed. As shown in FIG. 11 as an example, four light-receiving units 60 may be disposed. Each light-receiving unit 60 receives the optical signal OS from the remote controller 13. In this case, it is preferable to dispose the light-receiving units 60 at positions symmetrical to each other with respect to the third optical axis A3 such that the probability that each light-receiving unit 60 receives the optical signal OS is the same. In FIG. 11, the light-receiving units 60 are disposed at positions of about ±45° with respect to a line parallel to the Z direction passing through the third optical axis A3 and at positions of about ±100° with respect to a line parallel to the Z direction passing through the third optical axis A3. In a case where the plurality of light-receiving units 60 are disposed in this way, it is possible to further reduce the concern that the remote controller 13 may not work well.

Second Embodiment

In the above first embodiment, the light receiver 61 is attached to the first surface 50, but the technology of the present disclosure is not limited thereto. The light receiver 61 may be attached to the intermediate surface 53 as in the second embodiment shown in FIGS. 12 and 13 as an example.

Figure 12:
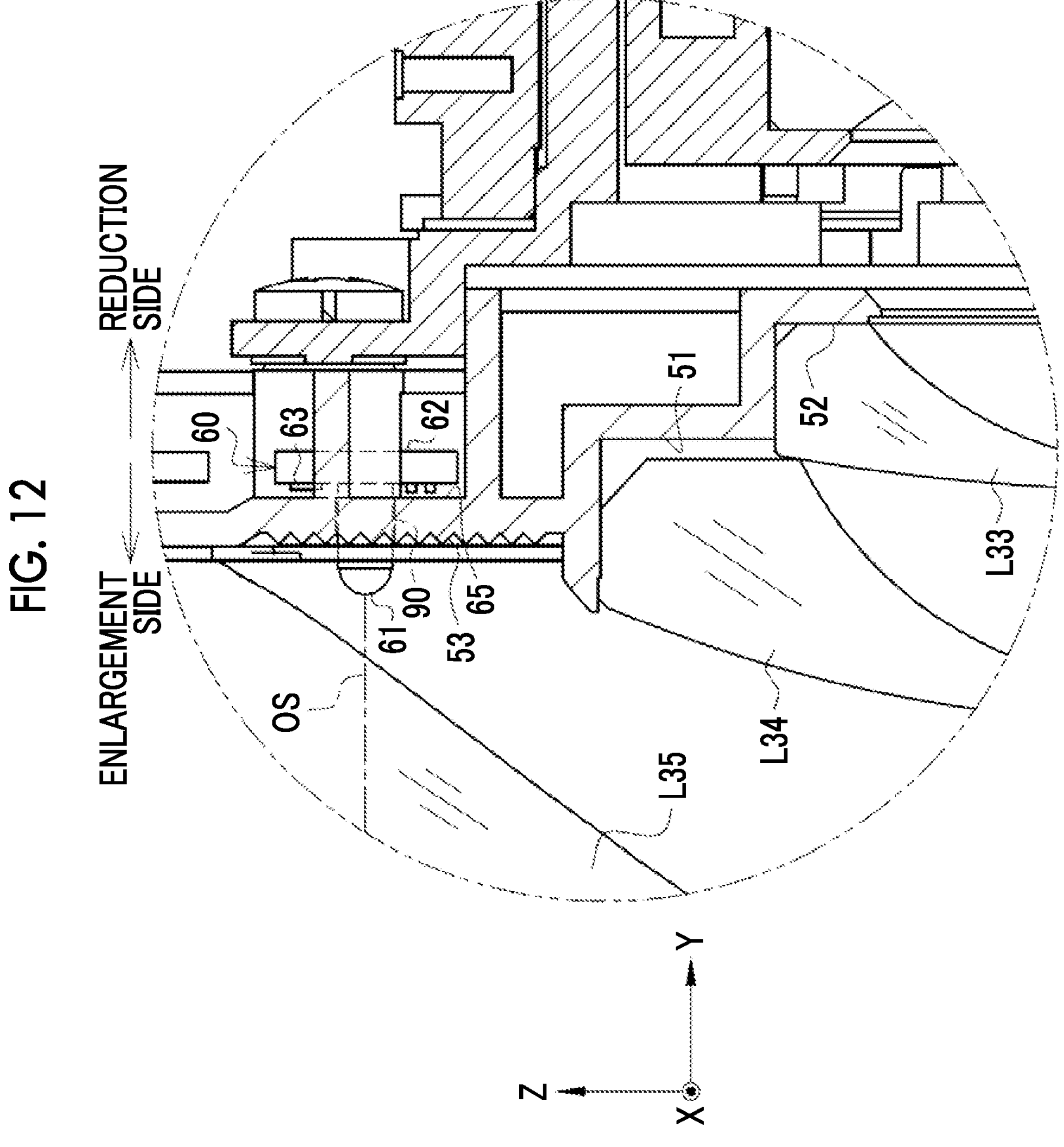
FIG. 12 is an enlarged cross-sectional view of a vicinity of an intermediate surface of the holding frame.
Figure 13:
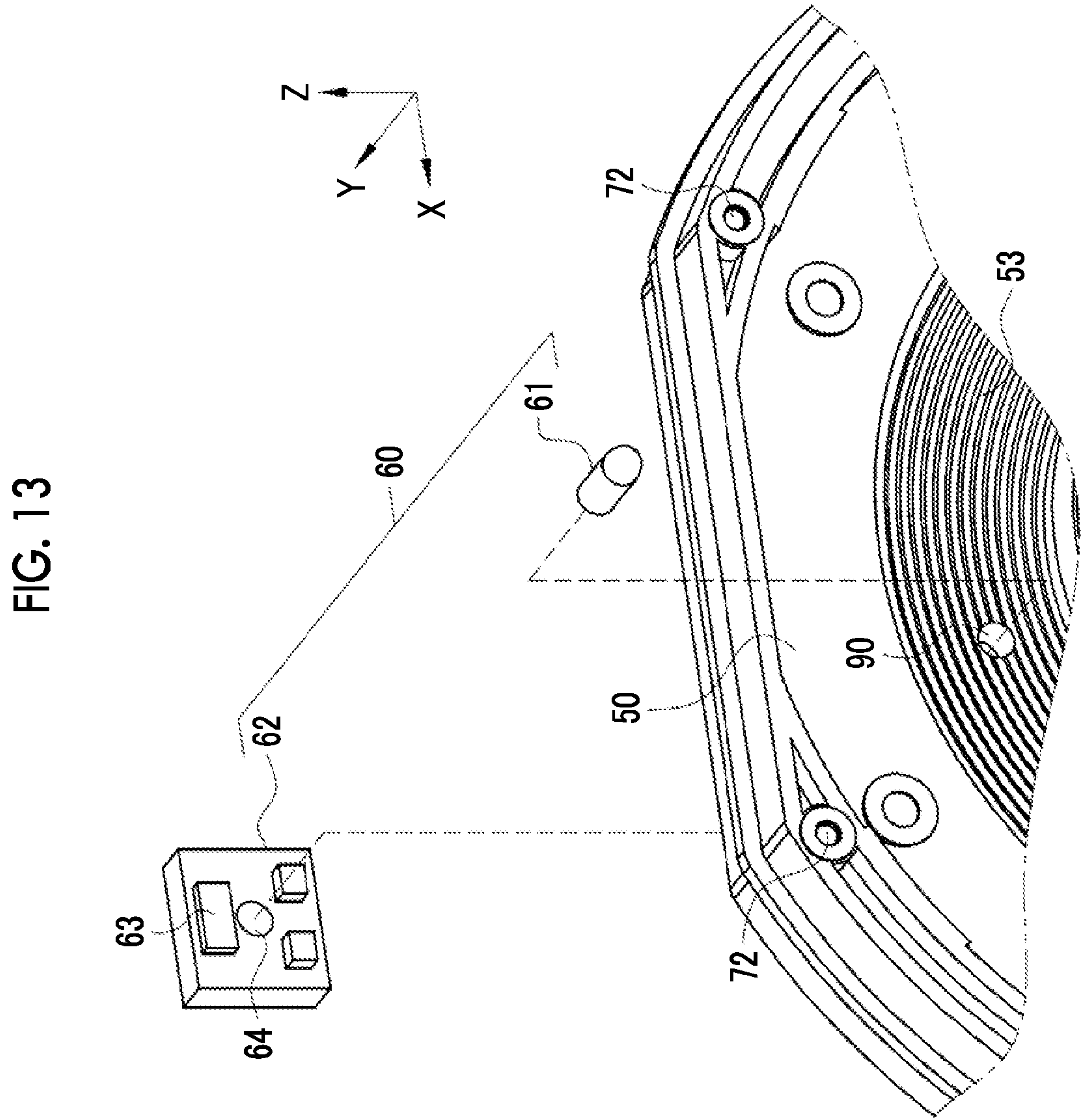
FIG. 13 is an enlarged perspective view of the vicinity of the intermediate surface of the holding frame.

In FIGS. 12 and 13, the light-receiving unit 60 is attached to the intermediate surface 53. In the light receiver 61, the tip with the built-in light-receiving element of the optical signal OS is disposed on the side of the intermediate surface 53. On the other hand, the circuit board 62 is disposed on the side of the back surface 65 of the holding frame 41.

A through hole 90 penetrating the intermediate surface 53 and the back surface 65 is formed in the holding frame 41. The through hole 90 has a diameter slightly larger than that of the light receiver 61. The light receiver 61 is inserted into the through hole 90. The light receiver 61 is fixed to the through hole 90 with an adhesive or the like.

As described above, in the second embodiment, the light receiver 61 is attached to the intermediate surface 53. The intermediate surface 53 is a surface that extends in the radial direction and that interconnects the first surface 50 and the second surface 51. Therefore, the intermediate surface 53 can also have a relatively large area, as in the first surface 50. Therefore, a sufficient space for disposing the light receiver 61 can be secured.

In particular, in this example, in a case where the radius of the lens surface of the emission lens L35 is denoted by G1 and the radius of the lens surface of the lens L34 is denoted by G2, the value of G1/G2 is 1.7 or more, and the emission lens L35 and the lens L34 have a relatively large difference in diameter. For this reason, the intermediate surface 53 can have a significantly large area, and the disposition of the light receiver 61 becomes easier.

The plurality of light-receiving units 60 may be attached to the intermediate surface 53. Further, the light-receiving units 60 may be attached to both the first surface 50 and the intermediate surface 53 by combining and implementing the above first embodiment and the second embodiment.

Third Embodiment

Figure 14:
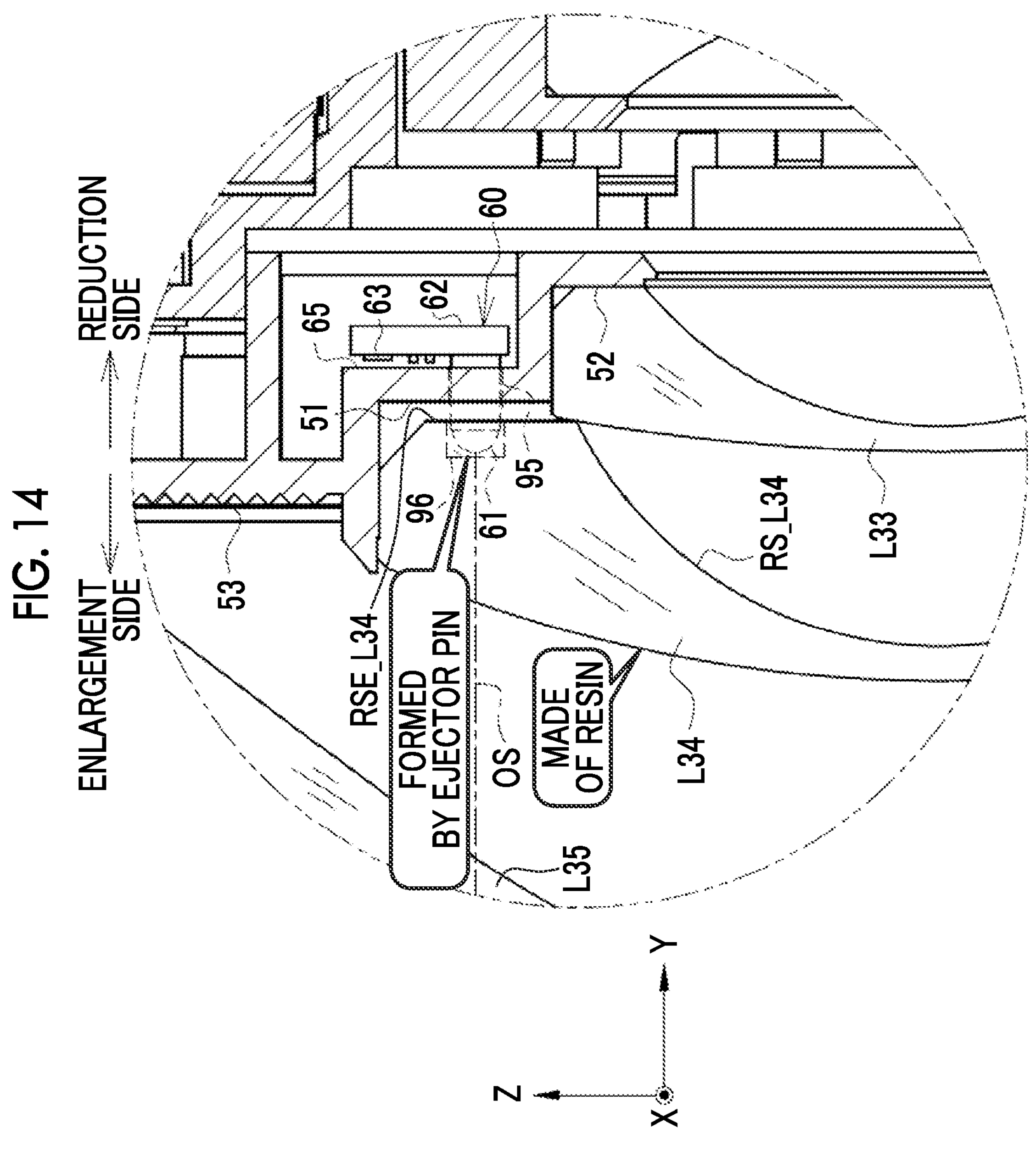
FIG. 14 is an enlarged cross-sectional view of a vicinity of a second surface of the holding frame.
Figure 15:
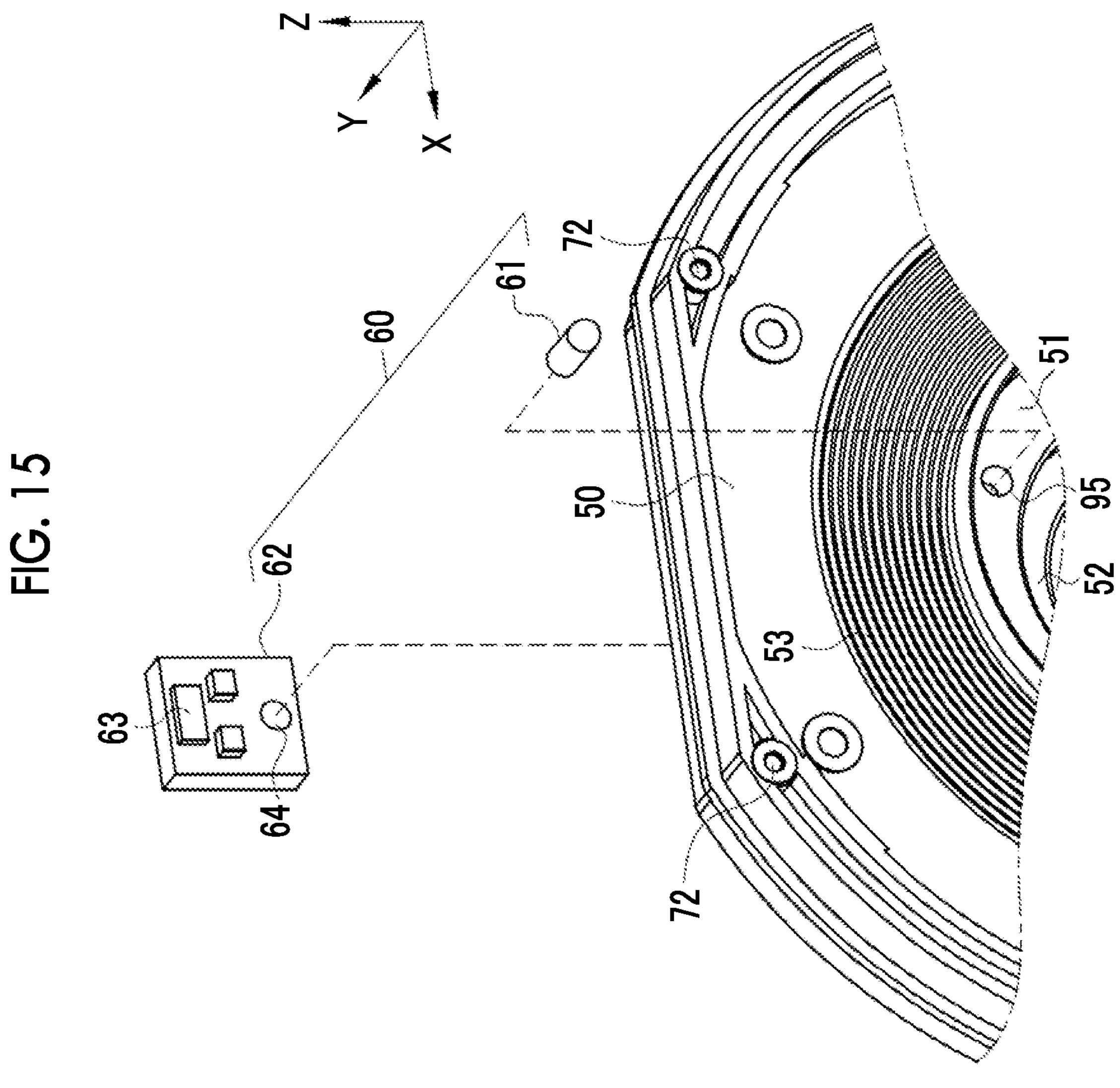
FIG. 15 is an enlarged perspective view of the vicinity of the second surface of the holding frame.

The light receiver 61 may be attached to the second surface 51 as in the third embodiment shown in FIGS. 14 and 15 as an example.

In FIGS. 14 and 15, the light-receiving unit 60 is attached to the second surface 51. In the light receiver 61, the tip with the built-in light-receiving element of the optical signal OS is disposed on the side of the second surface 51. On the other hand, the circuit board 62 is disposed on the side of the back surface 65 of the holding frame 41.

A through hole 95 penetrating the second surface 51 and the back surface 65 is formed in the holding frame 41. The through hole 95 has a diameter slightly larger than that of the light receiver 61. The light receiver 61 is inserted into the through hole 95. The light receiver 61 is fixed to the through hole 95 with an adhesive or the like.

In the third embodiment, the lens L34 is formed of a resin, such as a cycloolefin polymer, as in the emission lens L35 and the like. For this reason, the end portion RSE_L34 of the reduction-side surface RS_L34 of the lens L34 has a plurality of circular recess portions 96 (only one is shown in FIG. 14) having the same circular shape as the recess portion 80. The recess portion 96 is formed by an ejector pin used in a case where the lens L34, which is made of a resin, is extruded from the mold, as in the recess portion 80. As shown in FIG. 14, the tip of the light receiver 61 is disposed in the recess portion 96 which is one of the plurality of recess portions 96 and which is located at a position corresponding to the through hole 95.

As described above, in the third embodiment, the light receiver 61 is attached to the second surface 51. The optical signal OS from the remote controller 13 can also be received without any problem even by the light receiver 61 attached to the second surface 51.

The plurality of light-receiving units 60 may be attached to the second surface 51. In addition, the light-receiving units 60 may be attached to the first surface 50 and the second surface 51 by combining and implementing the above first embodiment and the third embodiment. Further, the light-receiving units 60 may be attached to the second surface 51 and the intermediate surface 53 by combining and implementing the above second embodiment and the third embodiment. Furthermore, the light-receiving units 60 may be attached to the first surface 50, the second surface 51, and the intermediate surface 53 by combining and implementing the above first embodiment, the above second embodiment, and the third embodiment.

The lens L34 may be formed of glass. Further, as in the case of the emission lens L35, the end portion RSE_L34 may not have the recess portion 96. In that case, the light receiver 61 need only be disposed by forming a gap for the light receiver 61 between the lens L34 and the second surface 51.

Fourth Embodiment

Figure 16:
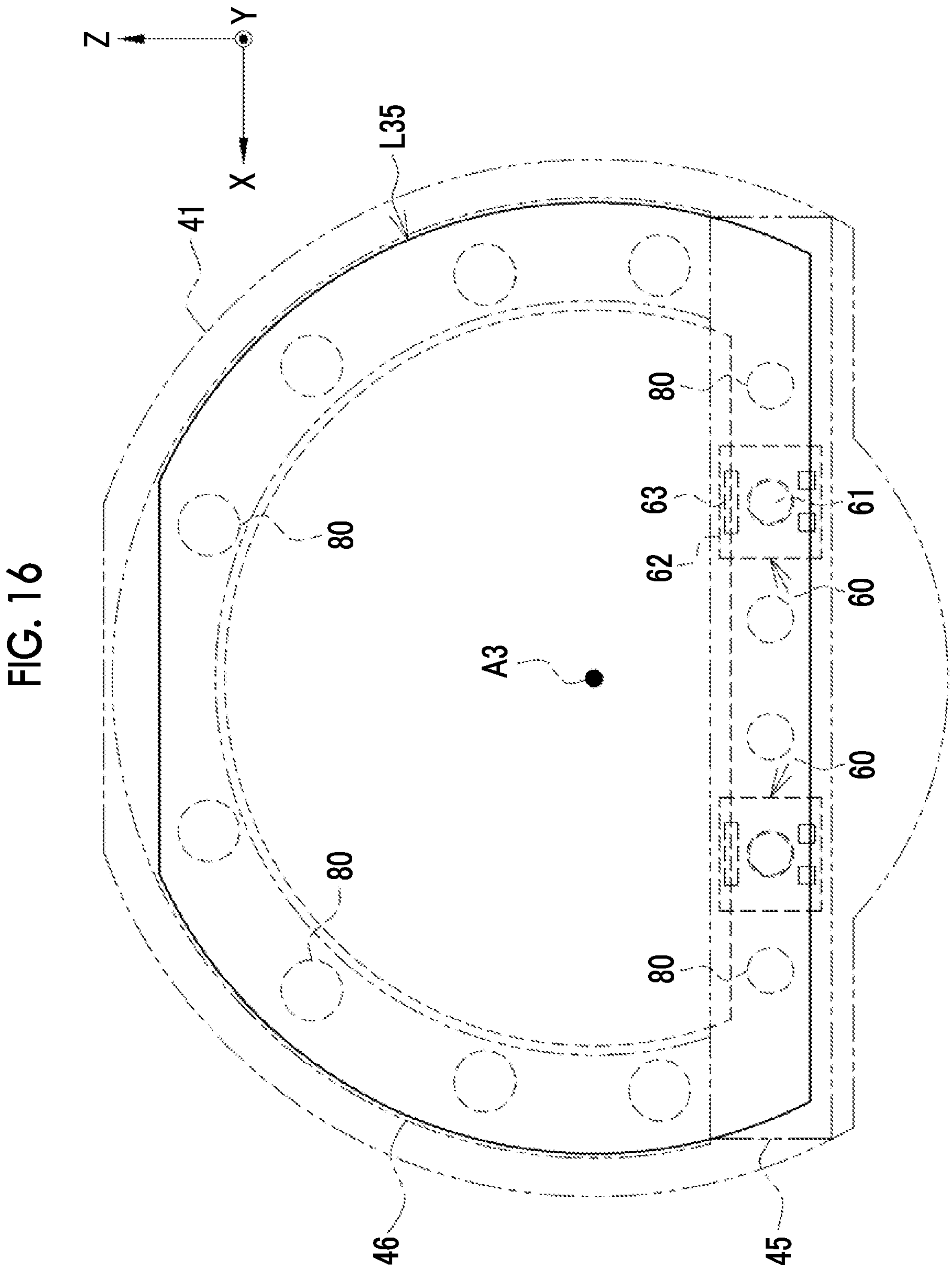
FIG. 16 is a diagram showing an example in which the light-receiving unit is disposed at a position facing a straight end part of the emission lens.

As shown in FIG. 16 as an example, the light receiver 61 may be disposed at a position facing the straight end part 45 of the emission lens L35. In this case, it is preferable to dispose the tip of the light receiver 61 in the recess portion 80 formed in the straight end part 45. FIG. 16 shows an example in which two light-receiving units 60 are disposed at positions of the straight end part 45 symmetrical to each other with respect to the third optical axis A3.

As described above, in the fourth embodiment, the light receiver 61 is disposed at a position facing the straight end part 45 of the emission lens L35. The optical signal OS from the remote controller 13 can also be received without any problem even by the light receiver 61 disposed at a position facing the straight end part 45.

The above first to third embodiments and the fourth embodiment may be combined and implemented. For example, the light-receiving units 60 may be attached to the first surface 50, the second surface 51, and the intermediate surface 53, and the light-receiving unit 60 may be disposed at a position facing the straight end part 45.

Fifth Embodiment

Figure 17:
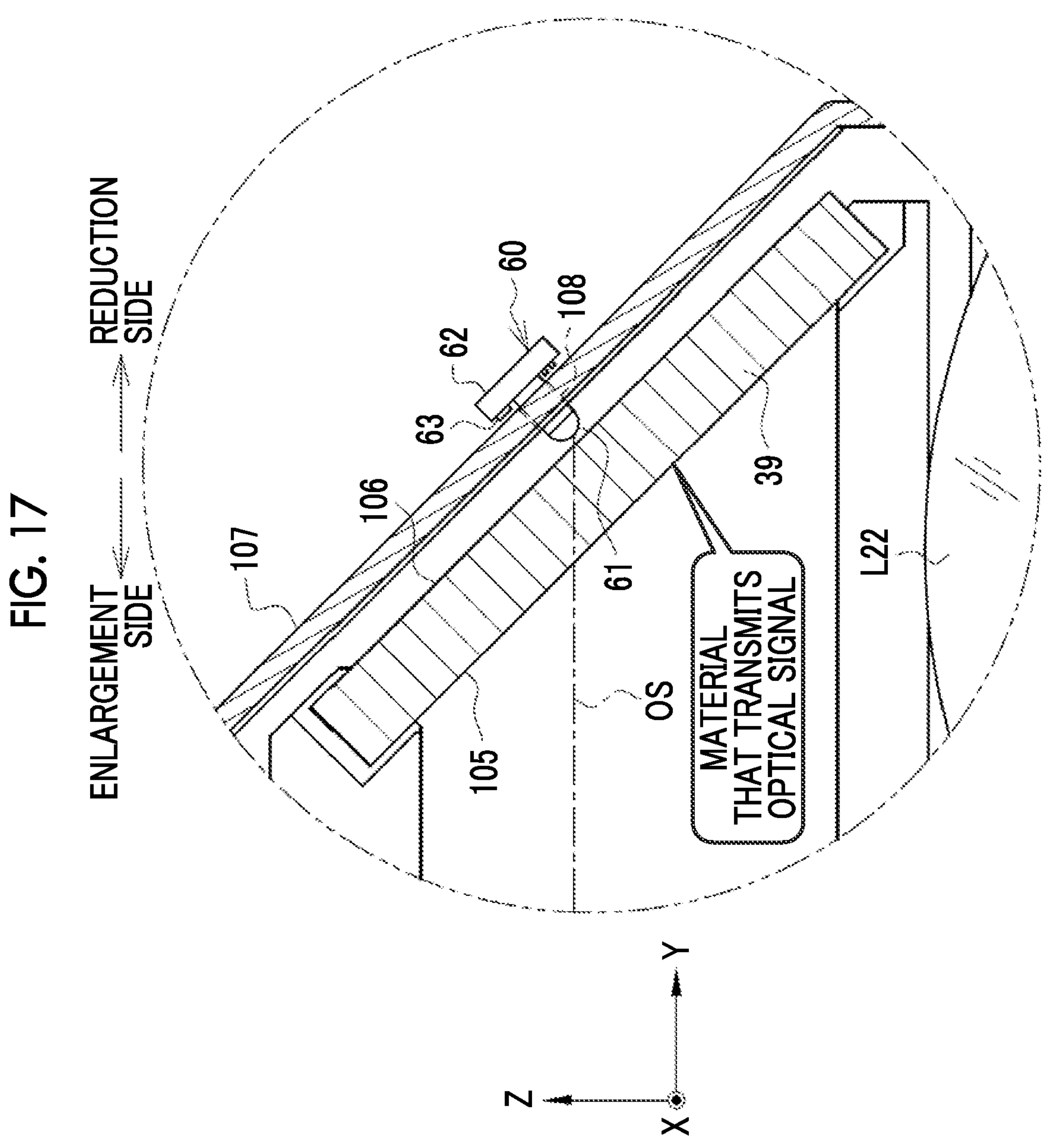
FIG. 17 is an enlarged cross-sectional view of a vicinity of a second mirror.
Figure 18:
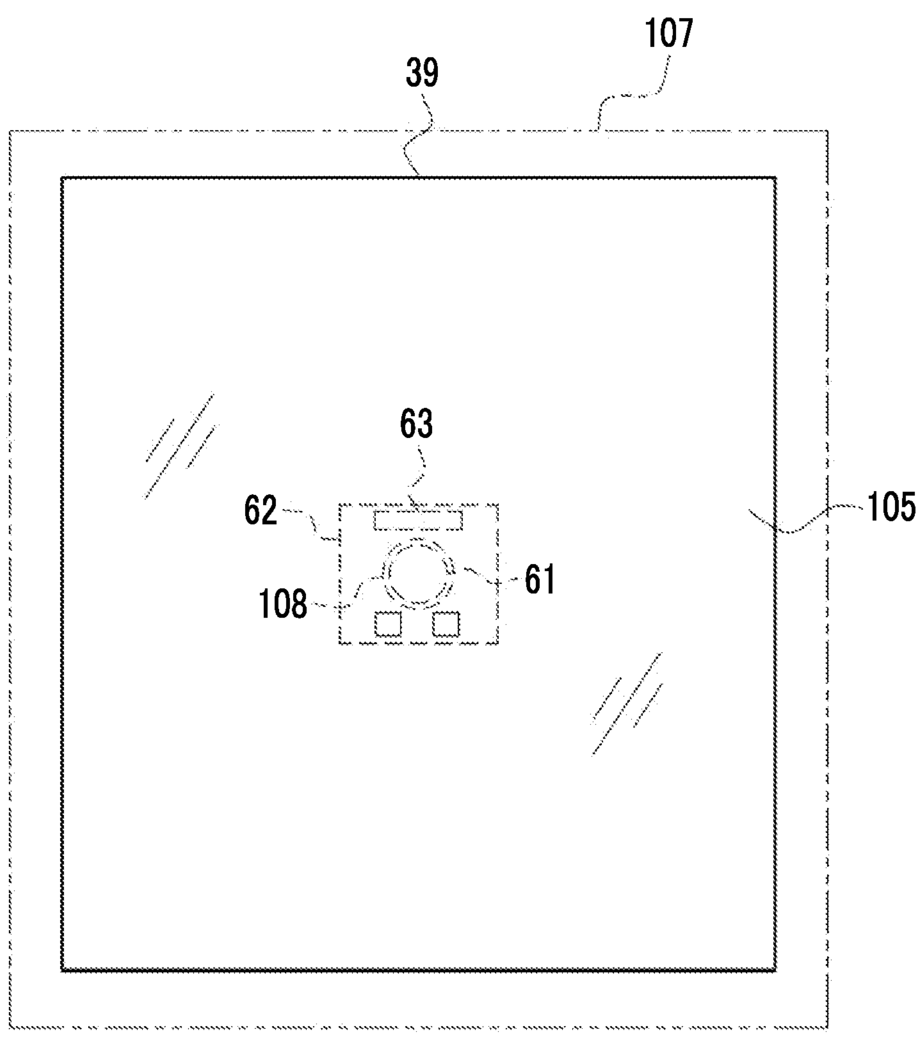
FIG. 18 is a diagram showing a positional relationship between the second mirror and the light-receiving unit.

As shown in FIGS. 17 and 18 as an example, the light receiver 61 may be attached to the periphery of the second mirror 39.

In FIGS. 17 and 18, the light receiver 61 is attached to a position facing a back surface 106 of the second mirror 39, which is a surface on a side opposite to a reflecting surface 105. More specifically, a through hole 108 is formed in a cover 107 that covers the back surface 106 of the second mirror 39. The through hole 108 is formed at a position of the cover 107 corresponding to the central portion of the second mirror 39. The through hole 108 has a diameter slightly larger than that of the light receiver 61. The light receiver 61 is inserted into the through hole 108. The light receiver 61 is fixed to the through hole 108 with an adhesive or the like. In the light receiver 61, the tip with the built-in light-receiving element of the optical signal OS is disposed on the side of the back surface 106 (inside the cover 107), and the circuit board 62 is disposed outside the cover 107.

The second mirror 39 is formed of a material that transmits the optical signal OS. In a case where the optical signal OS is, for example, infrared rays, the second mirror 39 is a so-called cold mirror having an optical thin film that reflects visible light and that transmits the infrared rays. For this reason, the optical signal OS transmitted through the emission lens L35 is transmitted through the lenses L34, L33, L32, L31, and the second mirror 39, and is received by the light receiver 61 attached to a position facing the back surface 106 of the second mirror 39.

As described above, in the fifth embodiment, the light receiver 61 is attached to the periphery of the second mirror 39, more specifically, at a position facing the back surface 106 of the second mirror 39. The optical signal OS from the remote controller 13 can also be received without any problem even by the light receiver 61 attached to the periphery of the second mirror 39.

The light receiver 61 is attached to a position facing the back surface 106 of the second mirror 39, which is on a side opposite the reflecting surface 105. The second mirror 39 is formed of a material that transmits the optical signal OS from the remote controller 13. Therefore, the optical signal OS can be received without any problem.

Figure 19:
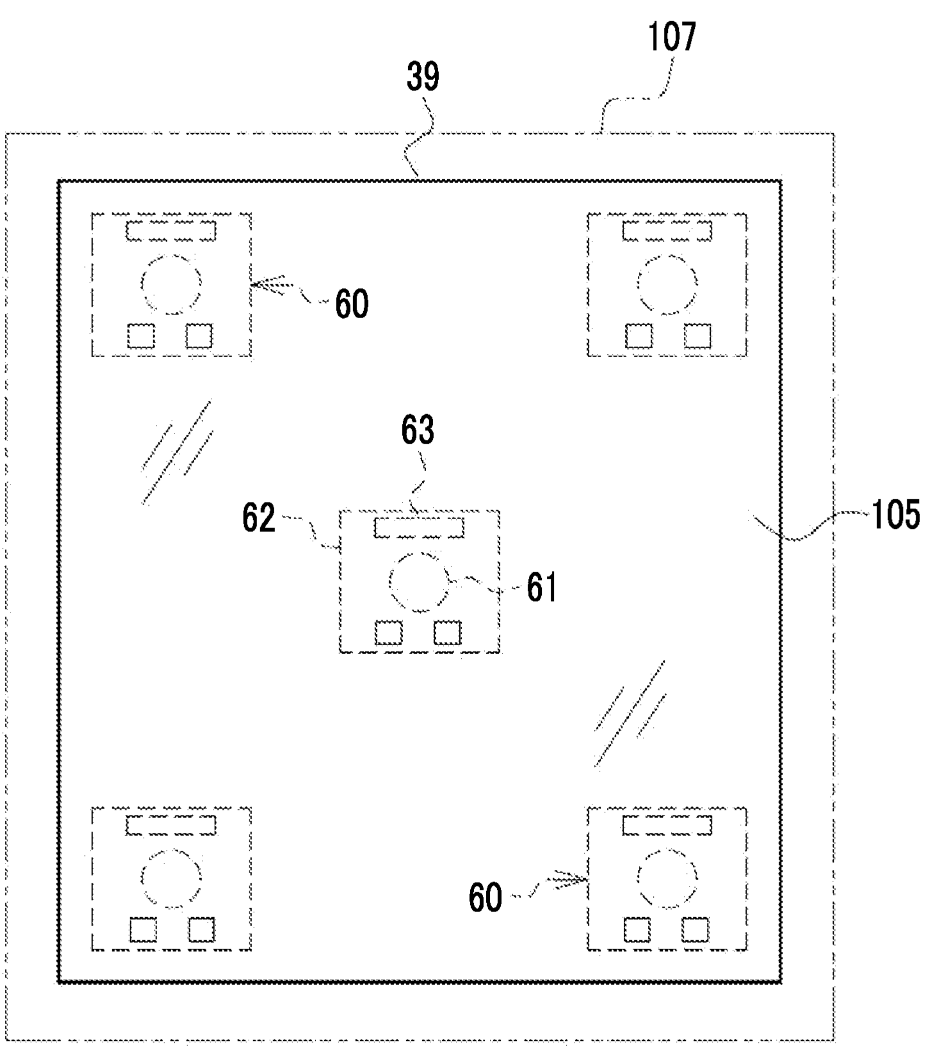
FIG. 19 is a diagram showing an example in which the plurality of light-receiving units are attached to positions facing the back surface of the second mirror.

As shown in FIG. 19 as an example, the plurality of light-receiving units 60 may be attached to positions facing the back surface 106. At this time, it is preferable to dispose the light-receiving units 60 at positions symmetrical to each other, as in the case of FIG. 11.

The "periphery" of the second mirror 39 includes not only the position facing the back surface 106 described above but also a range within, for example, 1 cm from the upper, lower, left, and right side surfaces of the second mirror 39. Therefore, although not shown, the light-receiving unit 60 may be disposed on the periphery of the second mirror 39 other than a position facing the back surface 106 of the second mirror 39, such as a position several mm away from the upper, lower, left, and right side surfaces of the second mirror 39.

The above first to fourth embodiments and the fifth embodiment may be combined and implemented. For example, the light-receiving units 60 may be attached to the first surface 50, the second surface 51, and the intermediate surface 53, and the light-receiving unit 60 is disposed at a position facing the straight end part 45 of the emission lens L35, and the light-receiving unit 60 may further be disposed on the periphery of the second mirror 39.

Furthermore, the light-receiving unit 60 may be attached to the third surface 52. Further, the light-receiving unit 60 may be attached to the periphery of the first mirror 38.

The substantially Z-shaped bending optical system having the first optical axis A1, the second optical axis A2, and the third optical axis A3 has been shown as an example, but the technology of the present disclosure is not limited thereto.

The first optical system L1 and the second optical system L2 are consecutively connected to each other in the Z direction, and the first optical axis A1 and the second optical axis A2 are integrated into one optical axis, whereby a substantially L-shaped bending optical system having the integrated optical axis and the third optical axis A3 may be used.

The third optical system L3, which is a magnifying optical system, has been shown as an example of the optical system, but the technology of the present disclosure is not limited thereto. A reducing optical system may be used.

As the image forming panel 15, a transmission type image forming panel using a liquid crystal display (LCD) instead of the DMD may be used. In addition, a panel formed of a self-luminous element, such as a light emitting diode (LED) or an organic electro-luminescence (EL), may be used instead of the DMD.

In the above first embodiment, an example has been described in which the laser light source is used as the light source 16, but the technology of the present disclosure is not limited thereto, and a mercury lamp, an LED, or the like may be used as the light source 16. In addition, in the above first embodiment, the blue laser light source and the yellow phosphor are used, but the technology of the present disclosure is not limited thereto, and a green phosphor and a red phosphor may be used instead of the yellow phosphor. Further, a green laser light source and a red laser light source may be used instead of the yellow phosphor.

The technology of the present disclosure can also appropriately combine the above-mentioned various embodiments and various modification examples. In addition, it is needless to say that the technology of the present disclosure is not limited to the above embodiments and various configurations may be employed without departing from the gist thereof.

The contents described and shown above are detailed descriptions of the parts related to the technology of the present disclosure, and are merely an example of the technology of the present disclosure. For example, the descriptions of the above configurations, functions, actions, and effects are the descriptions of an example of the configurations, functions, actions, and effects of the parts related to the technology of the present disclosure. Accordingly, it goes without saying that unnecessary parts may be deleted, new elements may be added, or replacements may be made with respect to the contents described and shown above, without departing from the gist of the technology of the present disclosure. Further, in order to avoid complications and facilitate understanding of the parts related to the technology of the present disclosure, descriptions of common general knowledge and the like that do not require special descriptions for enabling the implementation of the technology of the present disclosure are omitted, in the contents described and shown above.

All documents, patent applications, and technical standards described in the present specification are incorporated in the present specification by reference to the same extent as a case where each individual document, patent application, and technical standard are specifically and individually stated to be incorporated by reference.

What is claimed is:

1. A projection lens that projects an image light onto a projection surface, the projection lens comprising:
- an optical system including a first lens located on a most projection surface side;
- a light receiver that receives an optical signal from a remote controller, the light receiver being disposed at a position capable of receiving the optical signal transmitted through the first lens; and
- a holding frame that holds the first lens,
- wherein the light receiver is attached to the holding frame,
- wherein the optical system includes a second lens disposed on a side opposite to the projection surface of the first lens, the second lens having a lens surface with a radius smaller than a radius of a lens surface of the first lens,
- wherein the holding frame has
  - a first surface facing an end portion of the first lens,
  - a second surface facing an end portion of the second lens, and
  - an intermediate surface extending in a radial direction and interconnecting the first surface and the second surface, and
- wherein the light receiver is attached to at least one of the first surface, the second surface, or the intermediate surface.

2. The projection lens according to claim 1,
- wherein the optical system is a magnifying optical system that magnifies and projects the image light toward the projection surface.

3. The projection lens according to claim 1,
- wherein the light receiver is attached to the first surface or the intermediate surface.

4. The projection lens according to claim 3, further comprising:
- a circuit board on which a control circuit that controls an operation of the light receiver is mounted,
- wherein the light receiver is disposed on a side of the first surface, the second surface, or the intermediate surface, and
- the circuit board is disposed on a side of a surface of the holding frame, which is on a side opposite to the first surface, the second surface, or the intermediate surface.

5. The projection lens according to claim 3,
- wherein in a case where the radius of the lens surface of the first lens is denoted by G1 and the radius of the lens surface of the second lens is denoted by G2, a value of G1/G2 is 1.7 or more, and
- the light receiver is attached to the intermediate surface.

6. The projection lens according to claim 3,
- wherein the first lens or the second lens has a recess portion provided in a surface on the side opposite to the projection surface, and
- the light receiver is disposed in the recess portion.

7. The projection lens according to claim 1, further comprising:
- a circuit board on which a control circuit that controls an operation of the light receiver is mounted,
- wherein the light receiver is disposed on a side of the first surface, the second surface, or the intermediate surface, and
- the circuit board is disposed on a side of a surface of the holding frame, which is on a side opposite to the first surface, the second surface, or the intermediate surface.

8. The projection lens according to claim 7,
- wherein in a case where the radius of the lens surface of the first lens is denoted by G1 and the radius of the lens surface of the second lens is denoted by G2, a value of G1/G2 is 1.7 or more, and
- the light receiver is attached to the intermediate surface.

9. The projection lens according to claim 1, wherein in a case where the radius of the lens surface of the first lens is denoted by G1 and the radius of the lens surface of the second lens is denoted by G2, a value of G1/G2 is 1.7 or more, and the light receiver is attached to the intermediate surface.

10. The projection lens according to claim 1, wherein the first lens or the second lens has a recess portion provided in a surface on the side opposite to the projection surface, and the light receiver is disposed in the recess portion.

11. The projection lens according to claim 10, wherein the first lens or the second lens is made of a resin, and the recess portion is formed by an ejector pin used in a case where the first lens or the second lens is extruded from a mold.

12. The projection lens according to claim 1, wherein the first lens has a straight end part and a curved end part, and the light receiver is disposed at a position facing the straight end part.

13. The projection lens according to claim 1, further comprising:

a connection portion that is electrically connected to a projection device including an image forming unit that forms the image light, wherein the light receiver transmits the optical signal to the projection device via the connection portion.

14. The projection lens according to claim 13, wherein the projection lens is attachable to and detachable from the projection device through the connection portion.

15. The projection lens according to claim 1, wherein the remote controller is operated toward the first lens, and the optical signal emitted from the remote controller is transmitted through the first lens and received by the light receiver.

16. A projection device comprising:

the projection lens according to claim 1; and an image forming unit that forms the image light projected onto the projection surface through the projection lens.

* * * * *